United States Patent
Salkini

(10) Patent No.: US 12,082,310 B1
(45) Date of Patent: *Sep. 3, 2024

(54) SMART DISTRIBUTED ANTENNA SYSTEMS, PLATFORMS, AND METHODS

(71) Applicant: Tecore, Inc., Hanover, MD (US)

(72) Inventor: Jay Salkini, Cocoa, FL (US)

(73) Assignee: Tecore, Inc., Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,095

(22) Filed: Sep. 17, 2022

Related U.S. Application Data

(63) Continuation of application No. 17/504,309, filed on Oct. 18, 2021, now Pat. No. 11,452,176.

(51) Int. Cl.
| | |
|---|---|
| *H04W 88/10* | (2009.01) |
| *H04B 7/024* | (2017.01) |
| *H04W 76/16* | (2018.01) |
| *H04W 88/08* | (2009.01) |

(52) U.S. Cl.
CPC ............ *H04W 88/10* (2013.01); *H04B 7/024* (2013.01); *H04W 76/16* (2018.02); *H04W 88/085* (2013.01)

(58) Field of Classification Search
CPC ... H04W 88/08; H04W 88/085; H04W 88/10; H04W 16/26; H04W 16/28; H04W 76/15; H04W 76/16; H04B 7/02; H04B 7/022; H04B 7/024; H04B 7/0413; H04B 7/0452; H04B 7/06; H04B 7/0602; H04B 7/0686; H04B 1/40; H04B 1/0003; H04B 1/02
See application file for complete search history.

(56) References Cited

U.S. PATENT DOCUMENTS

| | | | | |
|---|---|---|---|---|
| 2003/0216153 A1* | 11/2003 | Golioto | ................ | E04H 1/1238 455/561 |
| 2018/0027431 A1* | 1/2018 | Cho | ..................... | H04W 24/04 455/424 |
| 2019/0319676 A1* | 10/2019 | Kim | .................... | H04L 27/2614 |
| 2023/0108782 A1* | 4/2023 | Kang | ............... | H04W 72/0446 370/336 |

\* cited by examiner

*Primary Examiner* — Peter Chen

(57) ABSTRACT

A platform hosting a smart distributed antenna system (sDAS) includes a multi-radio access technology (multi-RAT) digital unit (DU) (mDU). The mDU includes a radio management unit (RMU) configured as a software multiplexer enabling broadcast of multiple technologies from a single radio and a single mDU, a field programmable gate array (FPGA) coupled to the RMU and receiving signals digitized in the mDU from analog signals from a wireless carrier, and the FPGA maps received and digitized signals to frequency bands. An optical fiber interface is coupled to the FPGA to provide signals to more remote radio units over a single optical fiber cable. The radio units are coupled to the mDU through only a single optical fiber interface using a daisy-chain configuration. Each radio unit de-maps received digital signals to a specified frequency, converts de-mapped digital signals to RF signals, and provides the signals to a distributed antenna for broadcast.

20 Claims, 25 Drawing Sheets

SMART DISTRIBUTED ANTENNA SYSTEMS, PLATFORMS, AND METHODS

RELATED APPLICATIONS

This application is a continuation of U.S. patent application Ser. No. 17/504,309 filed Oct. 18, 2021 and entitled "Smart Distributed Antenna Systems, Platform, and Methods," now U.S. Pat. No. 11,452,176, issued Sep. 20, 2022, the disclosure of which is incorporated by reference.

BACKGROUND

Distributed antenna systems (DAS) are known and have been deployed to improve wireless communications in diverse environments. Distributed antenna systems may include networks of antennas connected to a common source with the antennas distributed throughout an area or volume. Distributed antenna systems may be used for indoor or outdoor applications. Distributed antenna systems may be used in buildings. Distributed antenna systems may be used for large structures such as stadiums and event venues that require support for high density of cellular wireless end users. Distributed antenna systems may be used in areas and volumes where mobile operator cell towers may not have adequate reach. Thus, a DAS may be deployed to increase capacity as well as to provide coverage. A DAS's signal source may receive cellular signals from a mobile carrier. Some DASs then may amplify the cellular signals and distribute the cellular signals throughout all or part of a specific area or volume.

SUMMARY

A platform hosting a smart distributed antenna system (sDAS) includes a multiple band (multi-band) and multiple radio access technology (multi-RAT) digital unit (DU) (mDU). The mDU includes a radio management unit (RMU) configured as a software multiplexer, the multiplexer enabling broadcast of multiple technologies from a single radio and a single mDU, a field programmable gate array (FPGA) coupled to the RMU and receiving signals digitized in the mDU from analog signals originating from a wireless carrier, and the FPGA executes to map received and digitized signals to frequency bands, and a common optical fiber radio interface (CPRI, eCPRI or ORAN compliant), coupled to the FPGA, in which mapped received digital signals are provided to one or more remote radio units over an optical fiber cable. The platform further includes multi-band and multi-RAT radio units (mRU) coupled to the mDU through the optical fiber radio interface. Each mRU includes a local FPGA that de-maps the mapped received digital signals to a specified frequency, a digital to analog converter that converts de-mapped digital signals to radio frequency signals, and a transmit section that provides the radio frequency signals to a distributed antenna for broadcast to a defined spatial volume.

A smart distributed antenna system (sDAS) includes a multi-band and multi-radio access technology (multi-RAT) digital unit (DU) (mDU). The mDU includes a radio management unit (RMU) configured as a software multiplexer, the software multiplexer software enabling broadcast of multiple technologies over multiple bands from a single radio and a single mDU, a field programmable gate array (FPGA) coupled to the RMU and receiving signals digitized in the mDU from analog signals originating from a wireless carrier, wherein the FPGA executes to map received and digitized signals to one of a plurality of frequency bands, and an optical fiber interface (CPRI, eCPRI or ORAN compliant) coupled to the FPGA, wherein banded received digital signals are provided to one or more remote radio unit over an optical fiber cable. The sDAS further includes a multi-point of interface (mPOI) coupled to the mDU and coupled to one or more base station equipment (BTS) installations, the mPOI receiving analog radio frequency signals from the coupled BTS installations and providing the analog signals to the mDU. The sDAS also includes one or more multi-RAT radio units (mRU) coupled to the mDU through a common optical fiber interface (CPRI, eCPRI or ORAN compliant), each of the one or more mRU including a local FPGA, wherein the local FPGA de-maps the banded received digital signals to a specified frequency, a digital to analog converter that converts de-mapped digital signals to radio frequency signals, and a transmit section that provides the radio frequency signals to a distributed antenna for broadcast to a defined volume.

A method for operating a smart distributed antenna system (sDAS), includes receiving by a processor of a multi-radio access technology digital unit (mDU), a digital representation of a first radio frequency (RF) signal having a specific frequency; mapping the digital representation to a specified frequency band based on the specific frequency of the first RF signal, thereby creating a mapped digital signal; transporting the mapped digital signal to one or more remote radio units; de-mapping the mapped digital signal in one or more of the remote radio units; converting the de-mapped digital signal to a second RF signal; and transporting the second RF signal to one or more distributed antennas for broadcast.

DESCRIPTION OF THE DRAWINGS

The detailed description refers to the following figures in which like numerals refer to like items, and in which.

DETAILED DESCRIPTION

Figure 1:
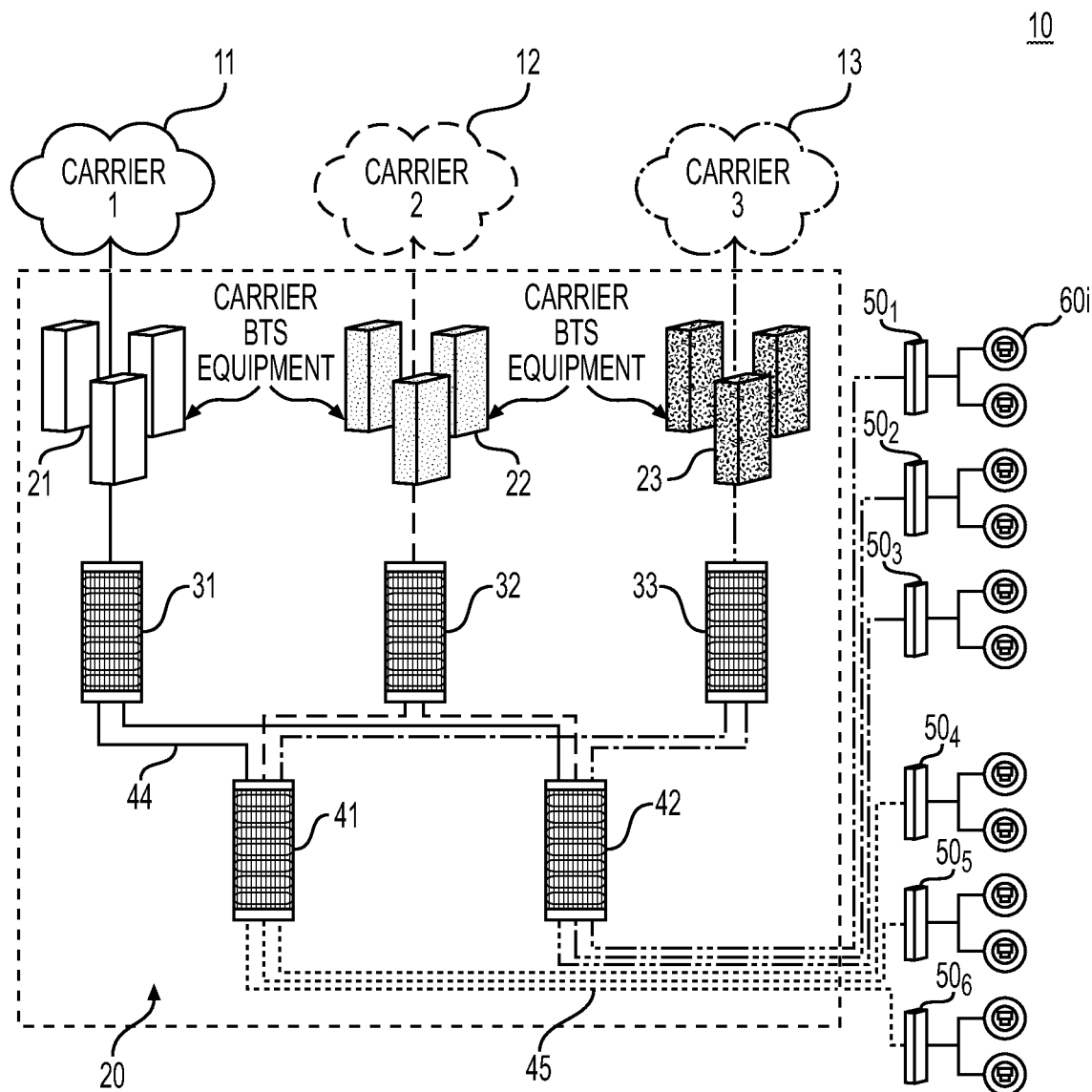
FIG. 1 illustrates a deployment of a prior art distributed antenna system (DAS)

Disclosed herein are smart distributed antenna systems (sDASs). Also disclosed are smart DAS platforms, and smart DAS methods. The herein disclosed systems, platforms and methods provide a significant technological advance over current DAS systems, platforms and methods, and represent a solution to problems and limitations that plague current systems platforms and methods. The disclosed sDAS and sDAS platforms include single fiber to multi-band and multi-radio access technology (mRAT) remote radio units (mRUs), serial linking (daisy-chaining) among the remote mRUs, single miband and multi-RAT digital units (mDUs), simultaneous signal processing of external analog signal inputs and digital distribution over single fiber, and shared sDAS signal point of management user interfaces.

Distributed antenna systems (DASs) may include two main components: a signal source and a signal distribution system. The signal source receives signals from and sends signals to mobile carriers. The signal distribution system distributes the signals throughout an area or volume. Current (i.e., legacy) DASs typically employ a network of distributed antennas that are coupled to one or more radio units, which in turn are coupled to one or more radio frequency interface components. In one implementation, the interface components may be coupled to a common core source, or to multiple core sources. Other current DAS are coupled to a donor wireless antenna, and function to distribute the signal received at the donor antenna to a network of distributed antennas. With either of these two architectures, the distributed antennas may supply signals to and receive signals from wireless devices operating in an area or volume serviced by the DAS.

Distributed antenna systems may be used for indoor or outdoor applications. Distributed antenna systems may be used in buildings. Distributed antenna systems may be used for large structures such as stadiums and event venues that require support for high density of cellular wireless end users. Distributed antenna systems may be used in areas and volumes where mobile operator cell towers may not have adequate reach or coverage. Thus, a DAS may be deployed to increase capacity as well as to provide coverage. Distributed antenna systems may be classified as passive or active. Passive DASs may have limited usefulness, particularly where signal amplification is needed. Thus, active DASs are employed in many large structures such as stadiums, airports, hotels, and conference centers, as well as in structures that are shielded from over-the air signaling.

Signal sources of current DASs include: off-air antennas (i.e., a donor antenna), on-site base transceiver stations (BTS), and small cells. All three signal sources serve to receive signals from nearby mobile carriers. Off-air DASs, which may be passive, use a donor antenna placed on the roof of a building to send and receive signals from a cell carrier. Off-air DASs may be less costly and easier to implement than other DAS types. Off-air DASs also may work with multiple carriers at a time. However, off-air DAS performance depends on donor signal strength and quality, as well as macro network congestion. Changes in donor signal can degrade network performance. Off-air DASs typically do not add extra capacity, often require retransmit agreements with each carrier prior to installation, and may be difficult to optimize for multiple carriers. On-site Base Transceiver Stations (BTS) (e.g., NodeB, and eNodeB) signal sources work the same way as cell towers. The BTS typically connects via fiber optic cables to a mobile operator's core network, and are separate from an enterprise IT infrastructure that might already be in place at a specific facility. Commonly, multiple BTS are installed, one or more BTS for each carrier. Base Transceiver Station signal sources tend to provide the best performance, including adding extra capacity for high-occupancy areas such as stadiums and airports. However, BTS signal sources tend to be the most expensive and slowest to deploy, partially because each carrier typically provides its own fiber optic cable and BTS equipment. Base Transceiver Station signal sources also require additional space, cooling, and power, which can increase operating costs.

Despite their cost and complexity, organizations may implement DASs to extend coverage and expand capacity for public mobile network connectivity—for their visitors and staff who take advantage of cellular wireless connectivity as part of the received service from mobile operators. This can help with large buildings with high-occupancy. This can also help with high-altitude buildings that normally suffer atmospheric interference, or buildings that are very far from cell towers. For example, hospitals benefit from distributed antenna systems that take strong cellular wireless signals and evenly distribute them to cover areas and high density of users. Alternately, large campuses and remote worksites can use a distributed antenna system to connect outlying regions of their operations with reliable public cellular service. Alternatives to distributed antenna systems include small cells. However, small cells usually support only a couple bands from a couple carriers at a time, whereas DASs typically can handle many more bands for more carriers. Thus, DASs tend to offer more capacity with more carriers than small cells. Furthermore, DASs only need a single backhaul connection and are built to support more end users, whereas small cells work on their own and generally can support only a few dozen end-user devices. In addition, it can be difficult to provide backhaul connections to each small cell, whereas with a DAS, only one point of connection is required and thus is easier to maintain.

FIG. 1 illustrates an example current deployment of a distributed antenna system (DAS) to support wireless communications in a facility such as a building. In FIG. 1, environment 10 includes mobile service providers (e.g., carrier 11, carrier 12, and carrier 13) that provide wireless services to one or more end users (not shown). Note that environment 10 may include more or fewer than the three carriers illustrated. In environment 10, each carrier has installed, at the facility, its own equipment arranged in multiple racks of base station equipment and multiple racks of Common Radio Access Network (RAN) equipment. In FIG. 1, the carrier's BTS equipment is shown installed in head-end room 20, which is a dedicated room in the facility. Thus, carrier 11 uses BTS equipment 21, carrier 12 uses BTS equipment 22, and carrier 13 uses BTS equipment 23. Coupled to the BTS equipment through cabling are point of interface (POI) trays 31, 32, and 33, with POI trays 31, 32, and 33 are coupled respectively to BTS equipment 21, 22, and 23. The POI trays 31, 32, and 33 are coupled by optical cabling 45 to remote radio units 50i. The remote radio units 50i may convert optical signals to RF signals for transmission using antennas 60i.

The current DAS shown in FIG. 1 is intended to provide enhanced wireless coverage and/or enhanced wireless coverage in the face of a growing end user demand for wireless data and wireless connectivity. These enhanced service objectives present technological and logistical challenges. First, there are multiple carriers, each with its own RAN equipment. Second, wireless technology is ever evolving, and includes, for example, 2G, 3G, 4G LTE, and 5G. Third, more wireless data products and applications come into existence daily, and end users want to access these products and applications without interruptions and delays. For example, end users in a large stadium for a sporting event may demand cellular service and WiFi access for voice, text, and data communications including streaming data applications. To achieve these service objectives, the current DAS shown in FIG. 1 requires many racks of equipment, creating a large footprint. The equipment also requires extensive active cooling, which adds to the space demands and furthermore is expensive to operate. Finally, installation and commissioning of current DASs are expensive and time consuming. Adding to these costs, the RAN equipment required for such service enhancements may be static in nature in that it takes into account only a current or initial set of wireless service providers and only addresses current wireless technologies available to end users. Thus, the current DAS of FIG. 1 is inflexible in that the current DAS of FIG. 1 does not easily allow for addition of wireless service providers beyond the initial configuration, and is not capable of accommodating the evolving nature of wireless technology. As a result, facilities ranging from large stadiums and convention centers to office buildings and shopping malls face both technological, logistical, and financial challenges when trying to provide or improve provision of wireless communications for their end users. These technological challenges, in particular, providing sufficient capacity and coverage in an ever-evolving wireless universe, are exacerbated when additional carriers are to be added to an existing DAS.

Figure 2:
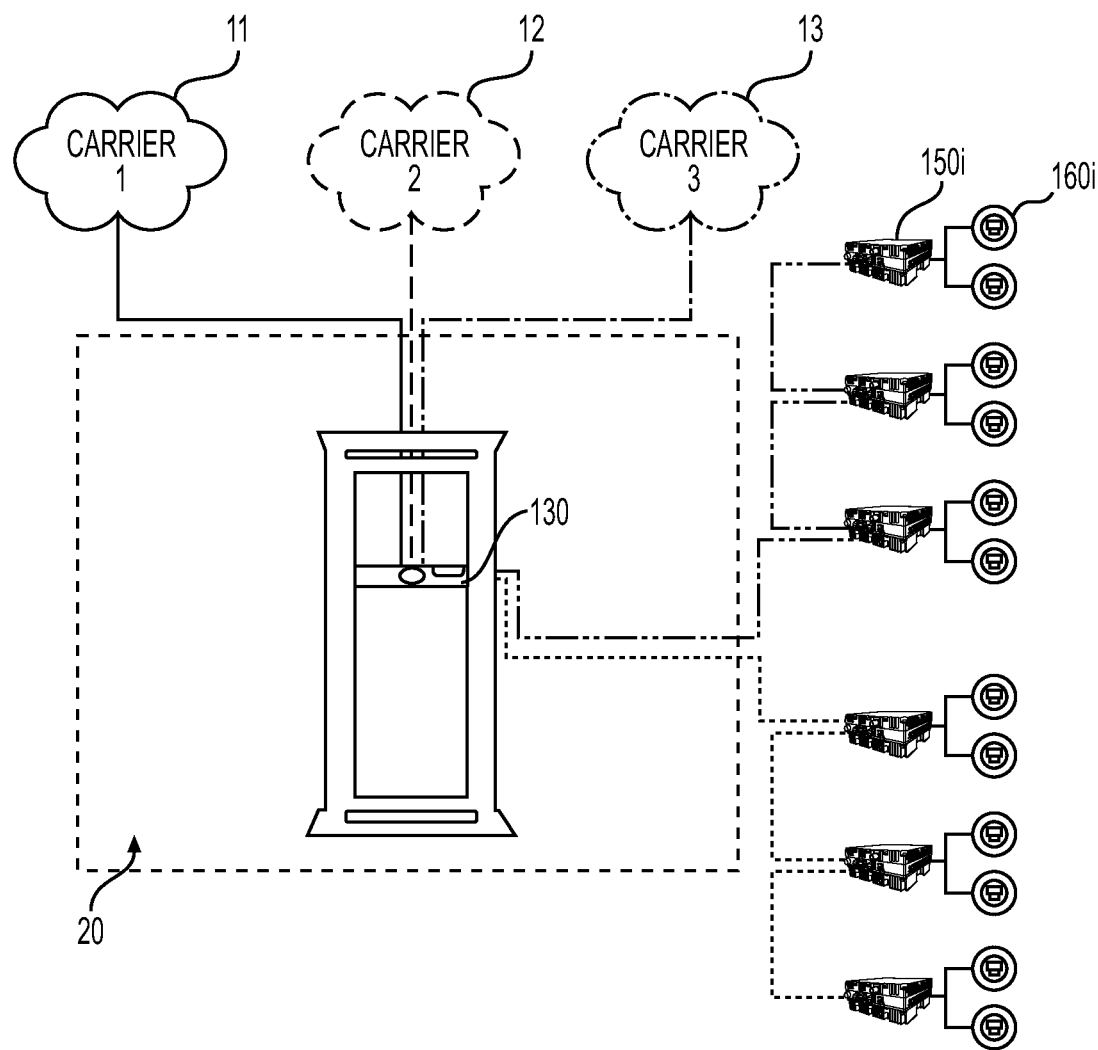
FIG. 2 illustrates an example smart DAS.

FIG. 2 illustrates an environment in which an example smart DAS addresses the technological challenges and shortcomings of current DASs, such as the DAS of FIG. 1. The example smart DAS does so with a lower initial cost (initial and commissioning) and a lower ongoing cost (cost to operate, cool, and maintain) while requiring a lower footprint and form factor and while accommodating future expansion both in terms of adding services and in adding evolving wireless technologies. In FIG. 2, a smart DAS (sDAS) installation in environment 100 provides connectivity to carriers 11, 12, and 13, each of which is shown directly coupled and/or wired (i.e., "core linked") to multi-Radio Access Technology (RAT) Digital Unit (mDU) 130 in head-end room 20, thereby dispensing with legacy BTS equipment, such as the BTS equipment shown in FIG. 1. The mDU 130 in turn is coupled using fiber optic cabling, to multi-RAT Radio Units (mRUs) 150i (i.e., baseband units), and thence to RF transmit/receive antennas 60i. Although FIG. 2 illustrates three carriers, fewer or more carriers may connect to mDU 130, and multiple mDUs 130 may be employed.

The architecture of FIG. 2 incorporates hardware and software components that support multi-frequency, multi-carrier, and multi-Radio Access Technology (RAT) functionality in a compact form factor with greatly reduced power and cooling requirements compared to current DAS installations such as the DAS of FIG. 1. Whereas the DAS of FIG. 1 requires rows of equipment racks and an extensive active cooling system, the only equipment required in the head-end room 20 of FIG. 2 is a single rack supporting mDU 130, and the associated cabling coupling carriers 11, 12, and 13 and mRUs 150i to the mDU 130. The significant reduction in the amount of equipment in the head-end room 20, as may be appreciated, reduces the needed head-end space requirement by up to 90 percent. The reduction in the amount of equipment required also reduces electrical and cooling service requirements by up to 90 percent. These reductions may, in turn, appreciably reduce the capital cost and the operational cost of the sDAS platform and sDAS compared to active DASs currently in use. Due to the significant reduction in the DAS platform's footprint, the sDAS greatly expands the number of buildings in which the sDAS platform may be deployed. The sDAS of FIG. 2 is much improved, technologically and financially, over the DAS of FIG. 1 owing, in part to the novel and non-obvious mDU 130. The mDU 130 is unique in part because the mDU 130 combines both digital and analog capabilities for multiple frequency bands. Some current DASs use external analog base stations with insertion points into a head-end for signal distribution in a 1:1 (band:band) arrangement. Other current DASs provide a digital signal from a base band and distribute that signal to a remote radio head over fiber or other transmission media. However, the sDAS of FIG. 2 performs both functions simultaneously, which allows operators to insert analog signals, use the local digital baseband resources, or perform both functions simultaneously on up to 4 active frequencies per mRU 150i, in a low-band or a mid-band configuration of the mRU 150i, across the present four generations of wireless technology (i.e., 2G GSM, 3G UMTS, 4G LTE, and 5G NR). Thus, the sDAS of FIG. 2 is a digital DAS as opposed to an analog DAS, such as that illustrated in FIG. 1. The sDAS of FIG. 2 combines a digital base band processing unit (i.e., mDU 130) that interfaces to multi-band, multi-channel, remotely distributed high power remote radio head units (i.e., mRUs 150i) across fiber optic (single mode or multi-mode) transmission media. Within the mDU 130 are x86 software radio access technology stacks (see FIG. 15). These software-based radio access technology stacks interface to a radio management unit (RMU) software multiplexer (also shown in FIG. 15), which in turn interfaces to a PCIe optical fiber interface (including, for example common public radio interface (CPRI), enhance CPRI (eCPRI), or open radio access network (ORAN compliant)) card within the mDU 130 (see FIG. 15), that connects to the mRUs 150i. In addition to natively generated 2G, 3G, 4G, and 5G radio access technologies, the sDAS of FIG. 2 also provides a legacy analog input interface by inclusion of a point of interface unit (see FIG. 5, mPOI 170), which allows DAS operators to connect third party equipment for signal distribution. Thus, the sDAS of FIG. 2 is adaptable to provide commercial grade coverage in 14 different bands from a common hardware platform (sDAS platform). The sDAS enables mobile operators to manage up to eight digital baseband cells or multiple analog inputs from a single management point (see FIGS. 23-26). Operators also are enabled to share common hardware resources for signal distribution within a facility to further minimize installation and management costs. Operators configure, manage, and monitor signals via a Web Management Interface. An operator can simply select the spectrum for which their RAT stack will operate, configure the RAT stack properties such as Cell ID, PCI, EARFCN, etc., set their target transmit power, and the RMU multiplexer function will add the signal source to the transmission path and bring the new cell into service. The sDAS is smart because it is highly adaptable, configurable, and future proof. The sDAS supports multiple frequency bands allowing mobile operators to deploy a common hardware footprint and configure via software up to eight digital cells of their software selected radio access technology. The sDAS allows for flexible frequency management allowing mobile operators to deploy signals in real-time via software configuration. Because the sDAS is digital and the remote radio heads are software controlled and managed via the RMU server-side software, each cell and radio access technology supports RF power output control at a per-cell level. The sDAS software architecture allows the sDAS platform to be shared between multiple mobile telecoms, in-building, or outdoor DAS operators. Each operator can independently manage their cells and radio access technologies via the mDU. Each operator can remotely access a mDU Web Management Interface and through their login credentials manage their radio access technologies within the spectrum that they are licensed to operate. From the Web Management UI, operators can add, delete, or modify their Radio Access Technologies in real-time.

Why has no other company come up with your product? Other companies have improved upon the legacy DAS system, but none have provided a combined solution that leverages the mobile Radio Access Technologies (RAT) on a common base-band system because they do not possess the underlying software/IP for the incorporated base station RAT technologies necessary for 2G GSM, 3G UMTS, 4G LTE, and 5G NR. The underlying base station software includes software-based macro base station functionality. The x86 based software utilizes real-time server processing and removes the need for costly digital signal processors (DSP) that legacy base stations use. The herein disclosed software-based radio access technologies move the entire legacy Base Station (BTS) hardware structure into a software package that performs the same functions. Thus, 2G GSM, 3G UMTS, 4G LTE, and 5G NR radio access technologies that operate in software rather than hardware, which run onboard the x86 based mDU server, interface to the RMU software multiplexer, and are distributed to the remote radioheads (MRU). This consolidation of the base station hardware provides the functionality in an onboard software-controlled platform whereas other DAS equipment requires external BTS equipment for signal generation, signal processing, and base-band processing functions. The sDAS digital capability address the limitations of the legacy DAS architecture, which include equipment size reduction, cost reduction, and simplification of management and real-time configuration of multiple radio access technologies from a single common platform. The legacy DAS of FIG. 1 relies solely on analog input sources from a POI that are transported via fiber or coaxial source to an amplifier or remote radio unit. The herein disclosed sDAS simplifies the overall DAS solution by collapsing the external base station requirements for each radio access technology by moving the hardware base station into a software solution that can be dynamically managed and configured to map digital signals to remote radio heads in real-time.

Figure 3:
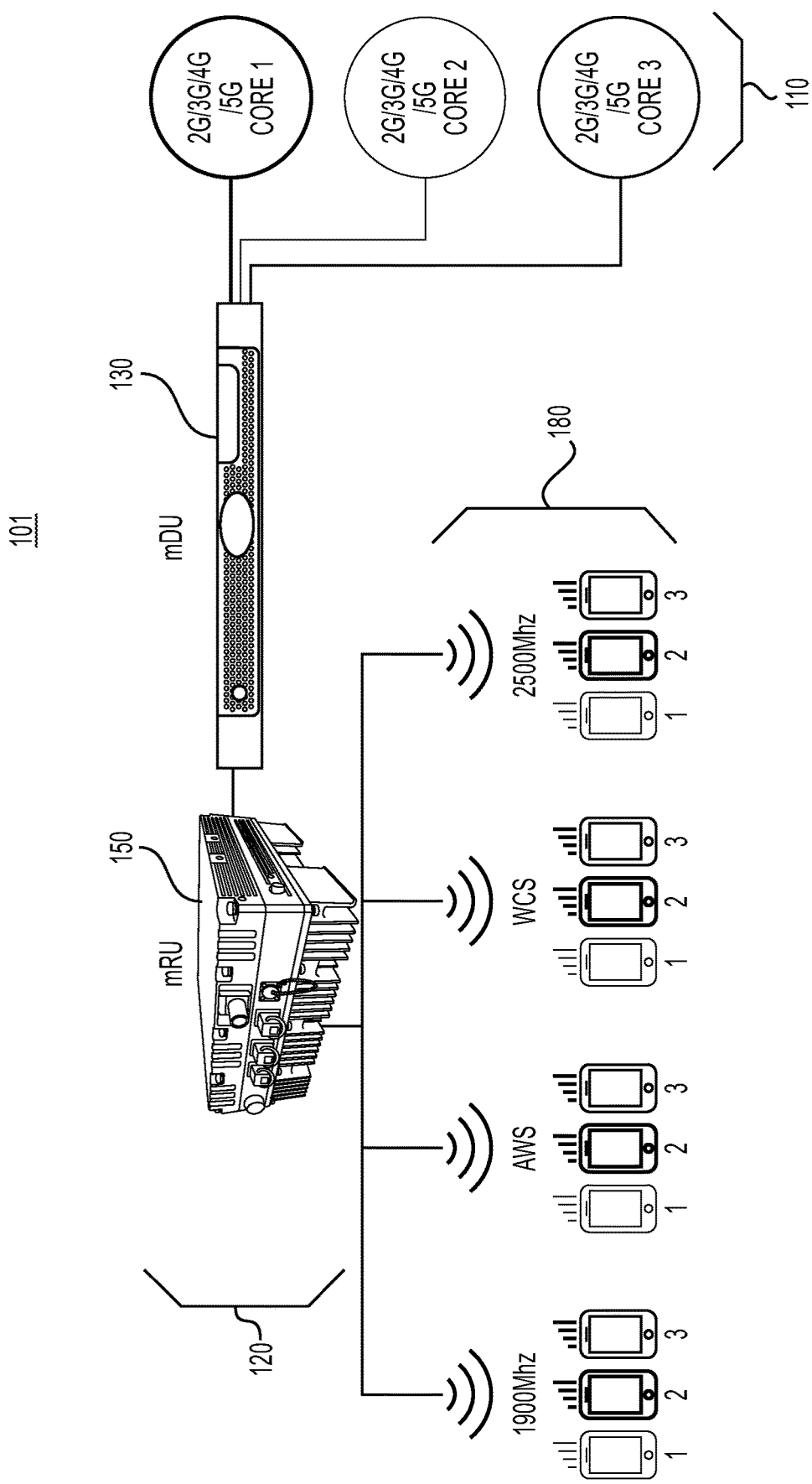
FIG. 3 illustrates aspects of the example smart DAS of FIG. 2.

FIG. 3 illustrates additional aspects the example sDAS of FIG. 2. An aspect of a sDAS platform is a multi-frequency, multi-RAT, multi-carrier framework allowing for a cost effective, flexible, and simplified provision of 2G, 3G, 4G, and 5G wireless networks, Multiple network operators can connect to an sDAS platform by way of the mDU 130. The frequencies are combined in the mRU 150 where each network operator's signals then are broadcast simultaneously and independently on multiple frequency bands, all in a small form factor radio.

In FIG. 3, example environment 100, in which example smart DAS (sDAS), sDAS platforms, and sDAS methods may be implemented, includes a core network 110, an access network 120, and end user devices 180. Access network 120 includes access devices (i.e., mDU 130 and mRU 150 (i.e., components of the sDAS platform)); core network 110 includes core devices 111, 112, and 113. The number, the type, and the arrangement of network devices in access network 120 and core devices 111, 112, and 113 in core network 110 may vary with a specific installation, and in FIG. 3, are shown as examples. The number and type of end-user devices 180 also are shown as examples. Furthermore, a network device, a network element, or a network function (all of which are referred to herein as a network device) may be implemented according to one or multiple network architectures (e.g., a client device, a server device, a peer device, a proxy device, a cloud device, a virtualized function, and/or another type of network architecture (e.g., SDN, virtual, logical, network slicing, etc.)). Additionally, a network device may be implemented according to various computing architectures, such as centralized, distributed, cloud (e.g., elastic, public, private, etc.), edge, fog, and/or another type of computing architecture. Environment 100 includes communication links between the network devices, and between end-user devices 180 and network devices. Environment 100 may be implemented to include wired, optical, and/or wireless communication links among the devices illustrated. A communication connection or communication link may be direct or indirect. For example, an indirect communication connection may involve an intermediary device and/or an intermediary network not illustrated in FIG. 3. A direct communication connection may not involve an intermediary device and/or an intermediary network. The number and the arrangement of communication links illustrated in environment 100 are examples. Environment 100 may include various planes of communication including, for example, a control plane, a user plane, and a network management plane. Environment 100 may include other types of planes of communication. A message communicated in support of the sDAS may use at least one of these planes of communication. Access network 120 may include one or multiple networks of multiple types and technologies. For example, access network 120 may include a Fourth Generation (4G) RAN, a 4.5G RAN, a Fifth Generation (5G) RAN, and/or another type of future generation RAN. By way of further example, access network 120 may be implemented to include an Evolved UMTS Terrestrial Radio Access Network (E-UTRAN) of a Long Term Evolution (LTE) network, an LTE-Advanced (LTE-A) network, and/or an LTE-A Pro network, and a next generation (NG) RAN. Access network 120 may further include other types of wireless networks, such as a WiFi network, a Worldwide Interoperability for Microwave Access (WiMAX) network, a local area network (LAN), or another type of network (e.g., a legacy third generation (3G) RAN, etc.). In an example, access network 120 may be implemented to include various architectures of wireless service, such as, for example, macrocell, microcell, femtocell, picocell, metrocell, NR cell, LTE cell, non-cell, or another type of cell architecture. Additionally, access network 120 may be implemented according to various wireless technologies (e.g., RATs, etc.), wireless standards, wireless frequencies/bands/carriers, licensed radio spectrum, unlicensed radio spectrum, and/or other attributes of radio communication. Access network 120 may include different and multiple functional splitting that relate to combinations of access network 120 and core network 110 including an Evolved PacketCore (EPC) network and/or a NG core (NGC) network, or the splitting of the various layers (e.g., physical layer, Media Access Control (MAC) layer, Radio Link Control (RLC) layer, and Packet Data Convergence Control (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), Enhanced Common Public Radio Interface (eCPRI), or Open Radio Access Network (O-RAN, ORAN) compliant interface, etc.) as well as other types of network services, such as dual connectivity (DC) or higher (e.g., a secondary cell group (SCG) split bearer service, a master cell group (MCG) split bearer, a SCG bearer service, non-standalone (NSA), standalone (SA), etc.), CA (e.g., intra-band, inter-band, contiguous, non-contiguous, etc.), network slicing, coordinated multipoint (COMP), various duplex schemes (e.g., frequency division duplex (FDD), time division duplex (TDD), half-duplex FDD (H-FDD), etc.), and/or another type of connectivity service. Depending on the implementation, access network 120 may include one or multiple types of network devices, such as mDU 130 and mRU 150. For example, access network devices 120 may include an eNB, a gNB, an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.)), or another type of wireless node. The mDU 130 and mRU 150 may include logic that provides the herein disclosed sDAS services and methods. Core network 110 may include multiple networks of multiple types and technologies. In an example, core network 110 includes a complementary network to access network 120. For example, core network 110 may be structured to include a core network of an LTE, LTE-A network, and/or an LTE-A Pro network, a next generation core (NGC) network and/or another type future generation core network. Core network 110 may include a legacy core network. Depending on the implementation, core network 110 may include various types of network devices, such as core devices 111, 112, and 113. In an example, core devices may include a packet gateway (PGW), a serving gateway (SGW), a home subscriber server (HSS), an authentication, authorization, and accounting (AAA) server, a policy charging and rules function (PCRF), a charging system (CS), a user plane function (UPF), an access and mobility management function (AMF), a mobility management entity (MME), a session management function (SMF), a unified data management (UDM) device, an authentication server function (AUSF), a network slice selection function (NSSF), a network repository function (NRF), a policy control function (PCF), a network exposure function (NEF), and/or an application function (AF). In another example, the core devices may include a non-standard and/or proprietary network device. End-user devices 180 include a device that has computational and wireless communication capabilities. Depending on the implementation, an end-user device 180 may be a mobile device, a portable device, a stationary device, a device operated by a user, or a device not operated by a user. For example, an end-user device 180 may be implemented as a Mobile Broadband device, a Machine Type Communication (MTC) device, an Internet of Things (IoT) device, an enhanced MTC device (eMTC) (also known as Cat-M1), a Narrow Band IoT (NB-IOT) device, a machine-to-machine (M2M) device, a user device, or other types of wireless end nodes. By way of further example, an end-user device 180 may be implemented as a smartphone, a personal digital assistant, a tablet, a notebook, a wearable device (e.g., a watch, glasses, etc.), a set top box, an infotainment system in a vehicle, a vehicle support system, a smart television, a game system, a music playing system, or other types of wireless end devices. An end-user device 180 may be configured to execute various types of software (e.g., applications, programs, etc.). The number and the types of software may vary among end-user devices 180. An end-user device 180 may support one or multiple RATs (e.g., 4G, 5G, etc.) and various portions of the radio spectrum (e.g., multiple frequency bands, multiple carrier frequencies, licensed, unlicensed, etc.), network slicing, DC service, and/or other types of connectivity services. Additionally, an end-user device 180 may include one or multiple communication interfaces that provide one or multiple (e.g., simultaneous) connections via the same or different RATs, frequency bands, carriers, network slices, for example. The multimode capabilities of end-user devices 180 may vary among end-user devices 180.

Table 1 summarizes example radio characteristics supported in 2G, 3G, 4G and 5G by the DAS of FIG. 3.

TABLE 1

| Description | Value |
| --- | --- |
| 2G/3G/4G/5G Mode | FDD/TDD |
| Frequency Bands - mRU Low Band Radio | 600, 700, 850 MHz Bands |
| Frequency Bands - mRU Mid Band Radio | 1900 MHz, AWS, WCS, 2500 MHz Bands |
| Max Output Power | 20 W per Band |

In an aspect, the mDU 130 connects to either a Low Band (LB) mRU or a Mid Band (MN) mRU on a per sector basis. Within each sector, the mRU 150*i* can daisy chain from a single fiber connection, using a standard optical fiber interface (CPRI, eCPRI or ORAN compliant) to the next mRU 150*i* of the same type, as shown in FIG. 4.

The mDU includes the radio management unit (RMU) which is a software multiplexer that serves as the software gateway between the radio and the RAT software stacks. The RMU is unique and exclusive to the sDAS and is the underlying software that enables the broadcast of multiple technologies from a single radio and a single base-band unit (mDU). The RMU, while technically not part of the optical fiber interface (CPRI, eCPRI or ORAN compliant) card, is a software component that resides on the mDU server that interfaces to the kernel optical fiber interface (CPRI, eCPRI or ORAN compliant) driver. The optical fiber interface (CPRI, eCPRI or ORAN compliant) card is a PCI Express Gen 3.0 8× device that is installed inside of the mDU 130. The CPRI card provides a digital interface between the radios and the RMU software within the server. The optical fiber interface (CPRI, eCPRI or ORAN compliant) card has 4 SFP+ modules that support up to Rate 8 (10.2 Gbps).

Figure 4:
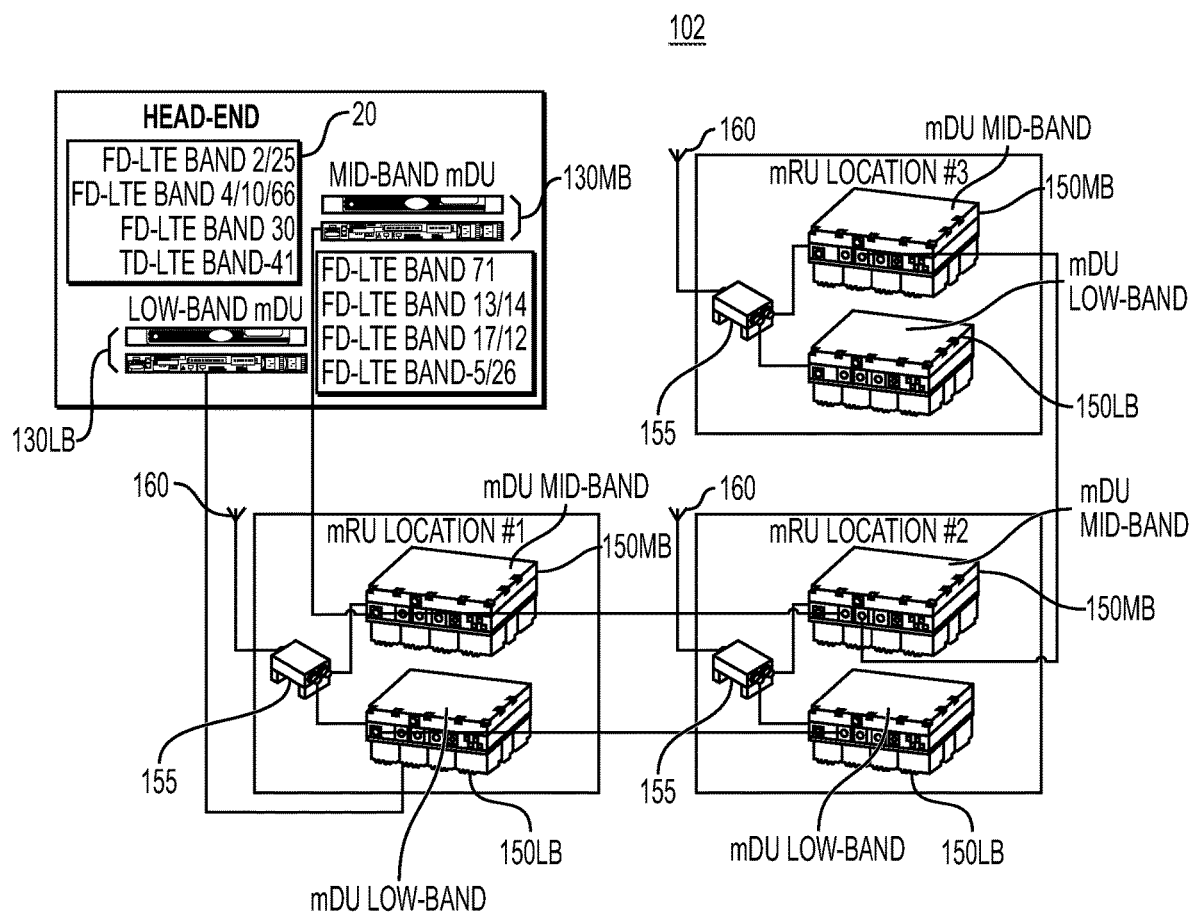
FIG. 4 illustrates additional aspects of the example smart DAS of FIG. 2.

FIG. 4 illustrates details of an example network layout for the example smart DAS of FIGS. 2 and 3. In FIG. 4, DAS installation 100 includes, in head-end room 20, low-band mDU 130LB and mid-band mDU 130MB. Corresponding mRUs 150LB and 150MB are coupled (daisy-chained) to the respective mDUs 130LB and 130MB through fiber optic cables. The mRUs 150LB and 150MB connect to RF antennas 160 via couplers 155.

In an aspect, the mDU 130LB and 130MB, mRU 150LB and mRU 150MB, along with their associated cabling, connections and software/firmware installations may constitute an example sDAS platform. As disclosed elsewhere herein, in this aspect, the mDUs 130 act as specially-programmed hardware servers and signal processors to condition, convert, and transport digital and analog signals to and from carriers (e.g., carriers 11, 12, and 13 of FIG. 2), to, in one example (e.g., the example sDAS of FIG. 2), replace carrier legacy base station hardware equipment (i.e., carrier BTS equipment 21, 22, and 23 of FIG. 1) with a small form factor, low power, and low heat generation hardware server (mDU 130 of FIG. 2) having stored therein machine instructions that when executed, perform the functions of legacy base station hardware systems; and in another example (e.g., the example sDASs of FIGS. 5 and 20), to interface, using a novel multi-carrier point of interface ((mPOI) 170—see FIGS. 5 and 20)), with legacy base station hardware systems.

Figure 5:
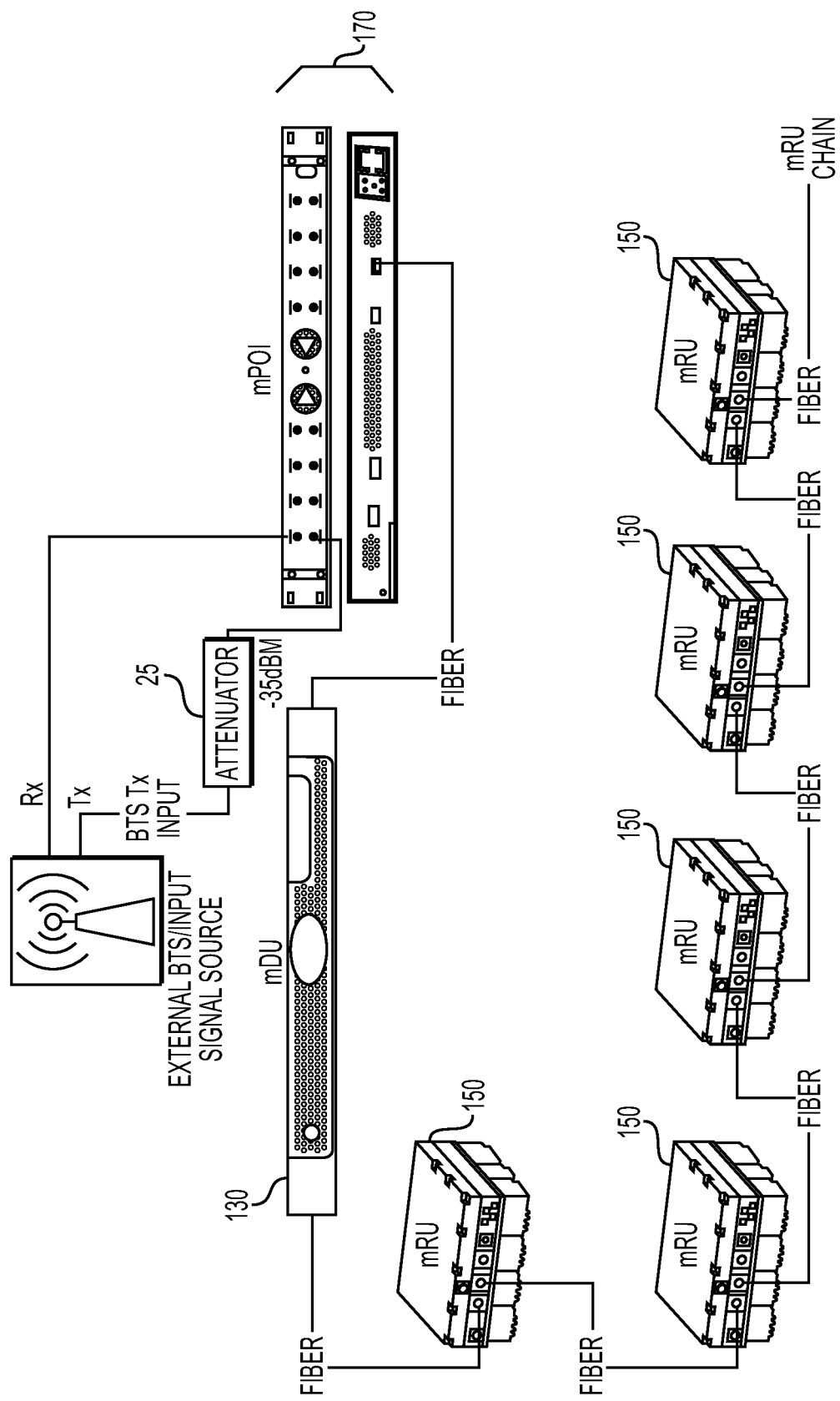
FIG. 5 illustrates an alternate example smart DAS.

FIG. 5 illustrates another example smart DAS. In FIG. 5, sDAS environment 101 is similar to sDAS environment 100 of FIG. 2. However, rather than directly connecting to mDU 130, carrier RAT equipment (BTS equipment) is coupled to a multi-carrier point of interface mPOI 170. From mPOI 170, fiber optic cable connects to mDU 130, and from mDU 130, fiber optic cable is daisy-chained to mRUs 150. Thus, the sDAS installation of environment 101 may be used in a facility having existing carrier RAN equipment installed (i.e., the carrier BTS equipment 21, 22, and 23 of FIG. 1). This sDAS installation may allow the utilization of existing carrier RAN equipment while obtaining the benefits of the sDAS platform's reduced equipment space, power, cooling, cabling, and configuration requirements. This sDAS installation also may provide a future-proofed platform and migration path to the full (i.e., "core link") sDAS installation/platform configuration of FIGS. 2 and 3 without the need to add any additional hardware at the head end. As with the sDAS of FIGS. 2 and 3, the sDAS components of the sDAS of FIG. 5 includes low-band and mid-band mRUs 150. The physical dimensions, size, power, and capabilities are common across both the low-band and mid-band mRUs 150. The mDU 130 provides configuration management of the mRus 150s, status control for the mRUs 150, an operating platform for the local RAT software (stacks—2G/3G/4G LTE/5G NR), and hosts the PCIe based optical fiber interface (CPRI, eCPRI or ORAN compliant) card, which is the physical interface for physical and logical connectivity to the mRUs 150. The mPOI 170 supports external basestation inputs from analog signal sources. The mPOI 170 may take as an input, any frequency division duplex (FDD) frequency band supported by the mid-band or low-band mRUs 150 with the exception of band-41-time division duplex (TDD), convert the signal from analog to digital and transport the signal across the optical fiber interface (CPRI, eCPRI or ORAN compliant) to the mRUs 150 where the signal is broadcast in the appropriate band. FIG. 5 also shows an example daisy chain connection of the mRUs 150 through the mPOI 170 and the mDU 130.

Figure 6:
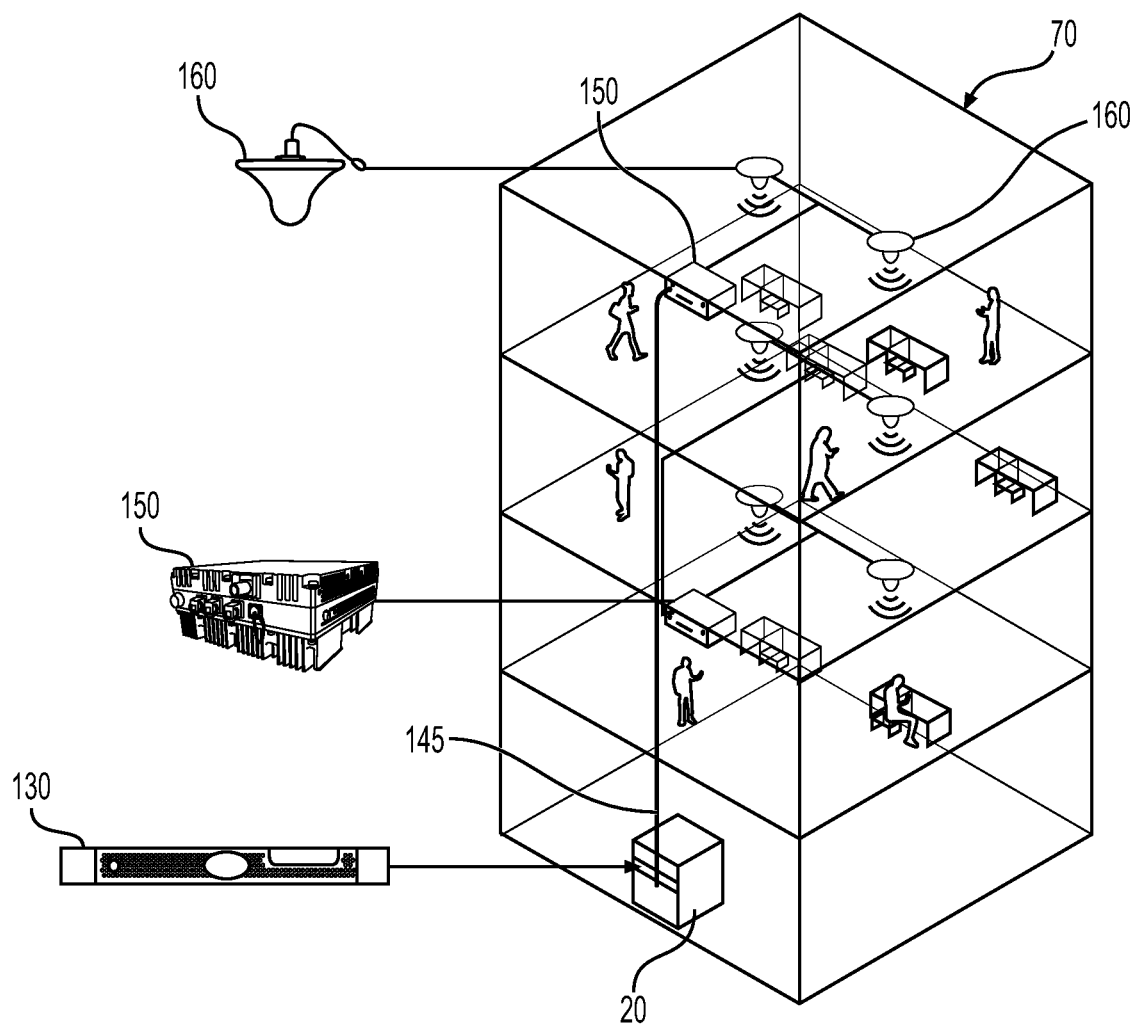
FIG. 6 illustrates an example implementation of the example smart DAS of FIG. 2.

FIG. 6 illustrates an example "core link" implementation of the example sDAS of FIGS. 2 and 3. In FIG. 6, building 70 includes mDU 130 installed in head-end room 20, where multiple carriers, such as carriers 11, 12, and 13 of FIG. 2, connect to the sDAS through RF cable 145 to the mDU 130. The output of mDU 130 passes through a fiber optic cable 145 that connects to mRUs 150, which are daisy-chained together by the fiber optic cable. The mRUs 150 convert the signal sent over fiber optic cable 145 to RF, and send the RF signal to antenna 160 over a coaxial cable. Note that antennas 160 are illustrated as omni-directional. However, the antennas 160 may include directional antennas. The antennas 160 transmit signals that may be received by wireless devices (not shown in FIG. 6; see FIG. 3 illustrating wireless devices 180) operating in building 70 under control of end users. The antennas 160 also may receive signals from the wireless devices.

The sDAS implementation of FIG. 6 maximizes the benefits of the sDAS platform by minimizing the equipment space, power, cooling, cabling, and arrangement requirements. The mDU 130 supports multiple S1 links from multiple network operators and functions as a base band unit to the mRUs 150. The mDU 130 is the only equipment needed in the head-end room 20 on a per sector and per mRU type (LB or MB) basis. This sDAS configuration eliminates a need for all the normal carrier RAN equipment as well as the normal active DAS head-end equipment typically found in a head-end room.

Figure 7:
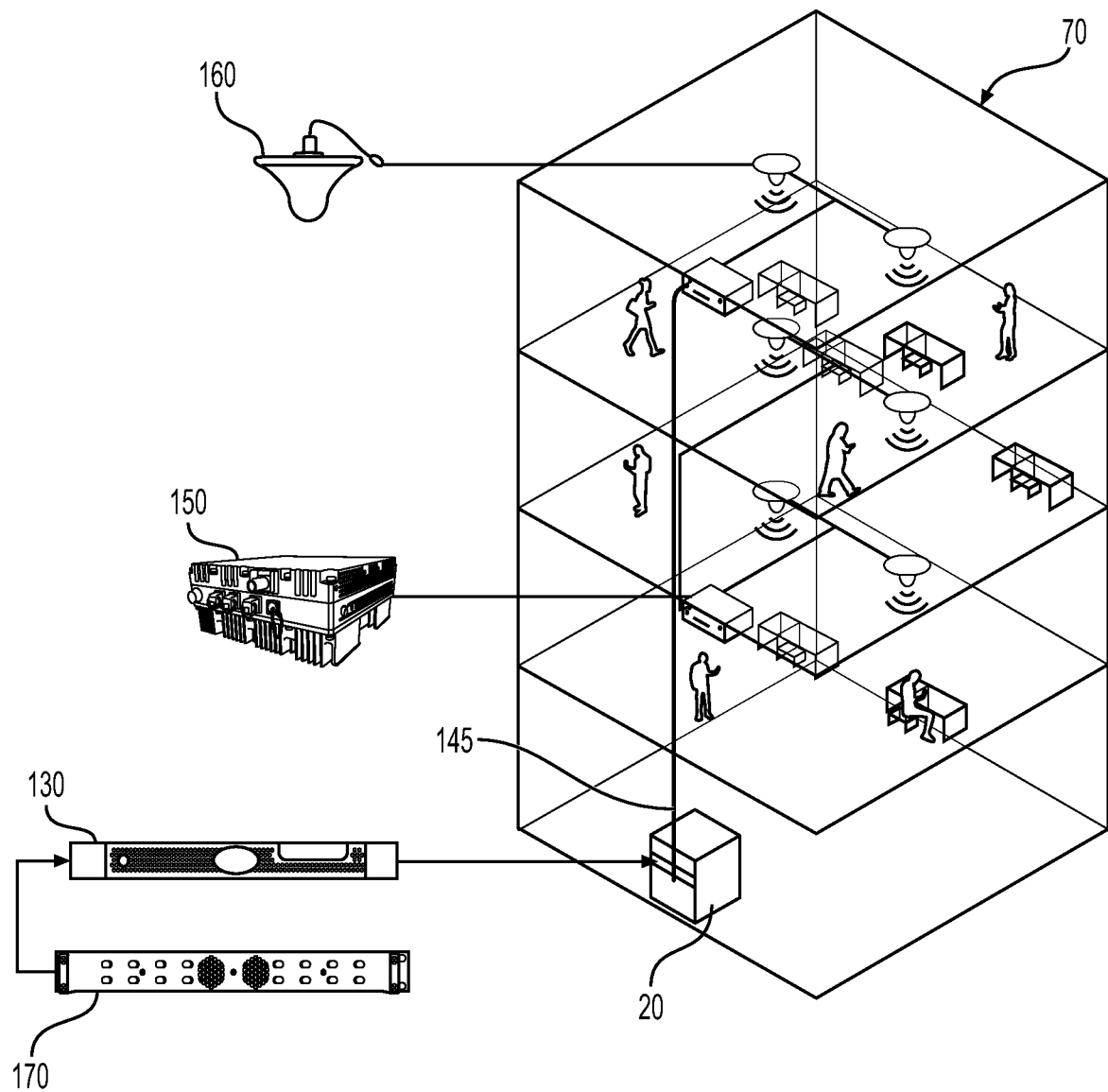
FIG. 7 illustrates an example implementation of the alternate example smart DAS of FIG. 5.

FIG. 7 illustrates an example point of interface implementation of the example sDAS of FIG. 5. The implementation of FIG. 7 is similar in some respects to the configuration of FIG. 6; however, rather than a direct connection to mDU 130, the carriers connect first (cable 144) to mPOI 170. The configuration of FIG. 7 allows the utilization of existing carrier RAN equipment while maintaining the benefits of the sDAS platform's reduced equipment space, power, cooling, cabling, and configuration requirements. The configuration of FIG. 7 also provides a future proofed platform and migration path to the full sDAS platform configuration without the need to add any additional hardware.

Figure 8:
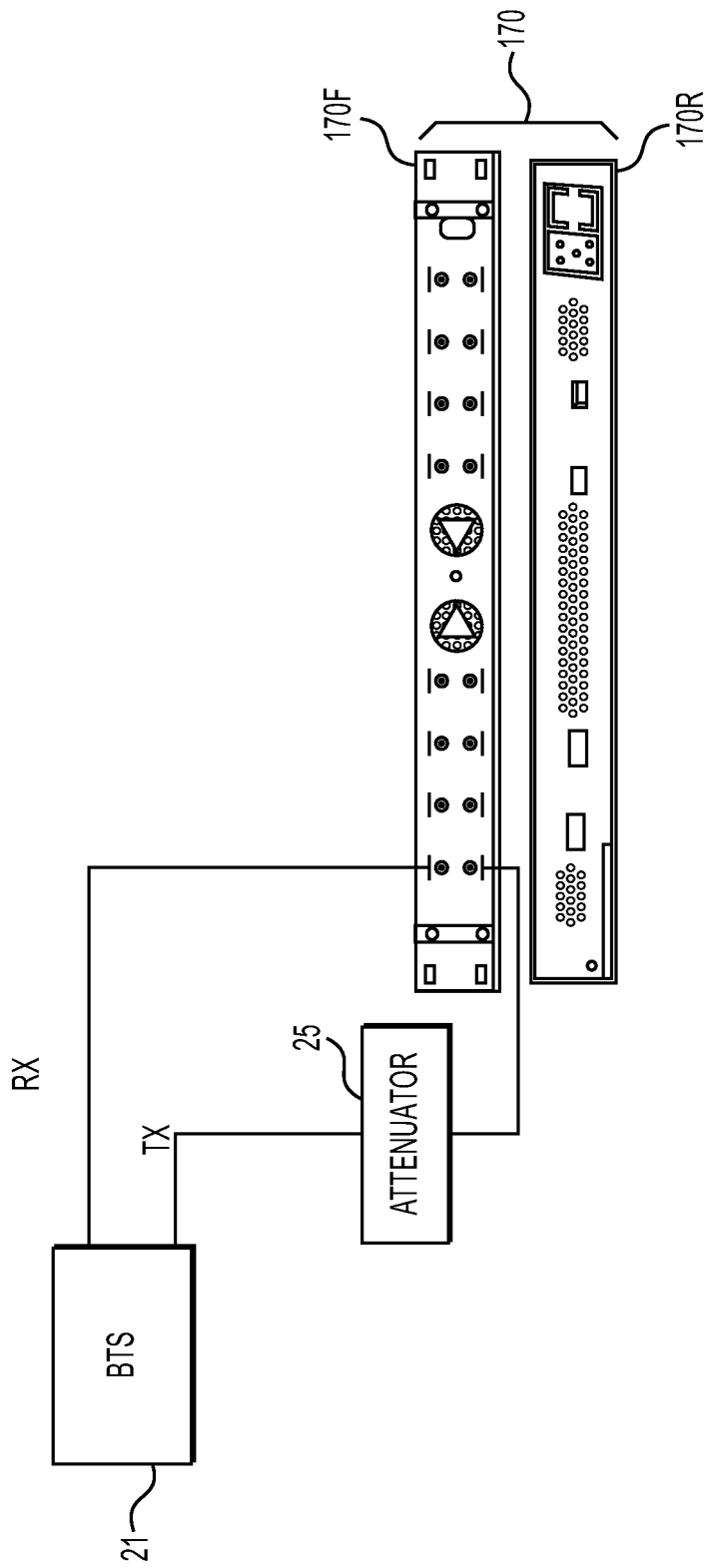
FIG. 8 illustrates an example multiple point of interface (mPOI) connection useable with the alternate smart DAS of FIG. 5.

FIG. 8 illustrates example mPOI connections useable in the sDAS configuration of FIG. 7. In FIG. 8, mPOI 170 is shown with front 170F and rear 170R displayed. Carrier BTS 21 is connected by Rx cable and by Tx cable, through attenuator 25, to the front 170F. The mPOI 170 supports up to eight analog input sources across two frequency bands via a connected mDU 130 (not shown). Multiple mPOIs may be used; each mPOI 170 can support up to two frequency bands and is connected via fiber optic cable to an associated mDU 130.

Figure 9A:
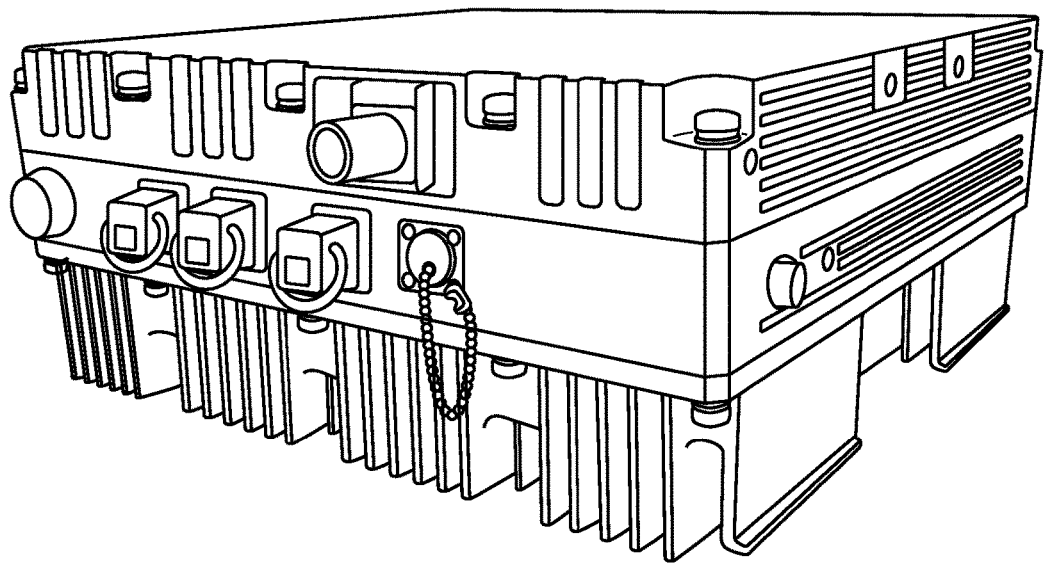
FIGS. 9A and 9B illustrate an example multi-RAT Radio Unit (mRU) employed in the smart DASs of FIGS. 2 and 5.
Figure 9B:
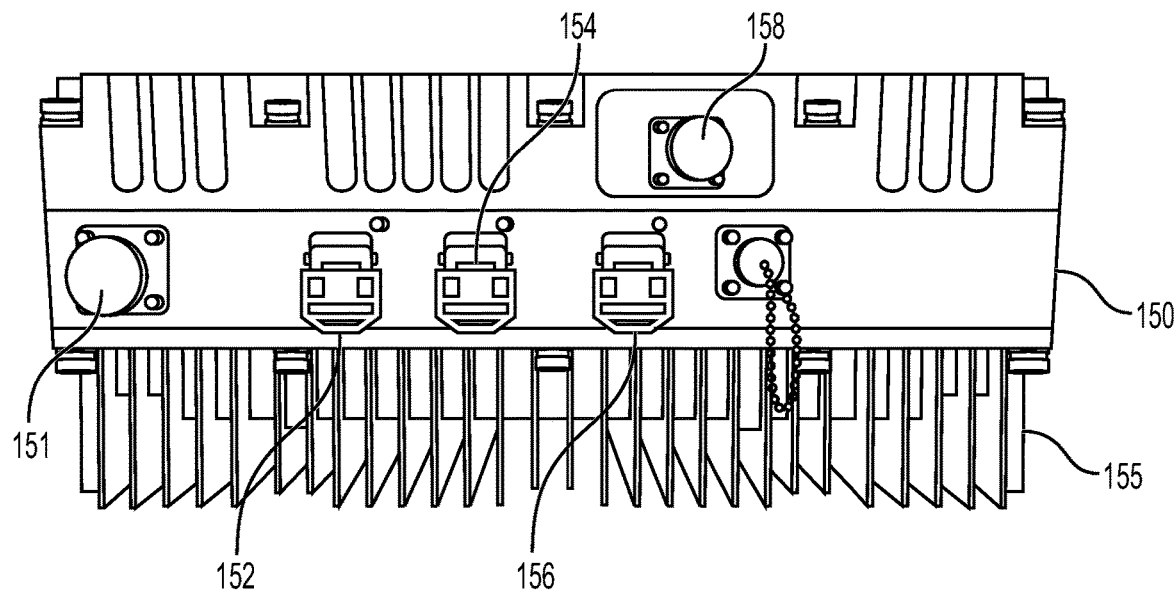

FIGS. 9A and 9B illustrate an example multi-RAT radio unit (mRU) employed in the smart DASs of FIGS. 2, 3, 5, and 20. FIG. 9A presents and isometric view of mRU 150, which may be configured as a low-band (LB) or a mid-band (MB)radio unit. FIG. 9B presents a front view of mRU 150, showing power port 151 SFP+optical fiber interface (CPRI, eCPRI or ORAN compliant) port 0 (port 152) and SFP+ CPRI port 1 (port 154); Bbe0 LAN port 156; and antenna port 158 for RF cable connection to a distributed transmit/receive antenna, such as antenna 160 (not shown in FIG. 9B). The mRU 150 may receive 100-240V AC power through power port 151. The SFP+optical fiber interface (CPRI, eCPRI or ORAN compliant) port 0 (port 152) is used to connect to the mDU 130 (not shown in FIG. 9B). The SFP+optical fiber interface (CPRI, eCPRI or ORAN compliant) port 1 (port 154) is used to daisy chain to another mRU 150. The mRU 150 employs passive cooling fins 155, and mRU 150 may be placed indoors or outdoors, although for outdoor installation, the mRU 150 may be sun-shielded, depending on ambient temperature) and protected from moisture (e.g., in a ventilated cabinet and with proper connections and seals). The Bbe0 LAN port 156 is used for local connection, management, and control of the mRU 150.

Figure 10:
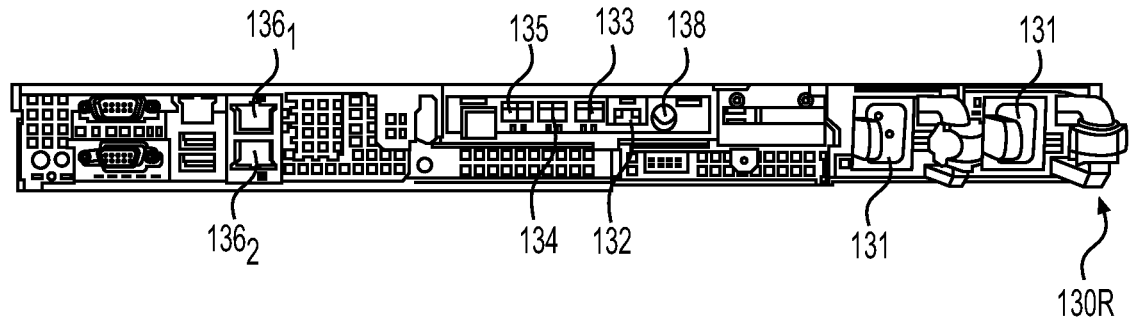
FIG. 10 illustrates access ports and connections on an example multi-Radio Access Technology (RAT) Digital Unit (mDU)

FIG. 10 illustrates access ports and connections on an example multi-Radio Access Technology (RAT) Digital Unit (mDU), such as mDU 130 of FIG. 2. FIG. 10 illustrates a rear view (130R) of mDU 130, with connections to mRUs and other components of the sDAS.

Figure 11:
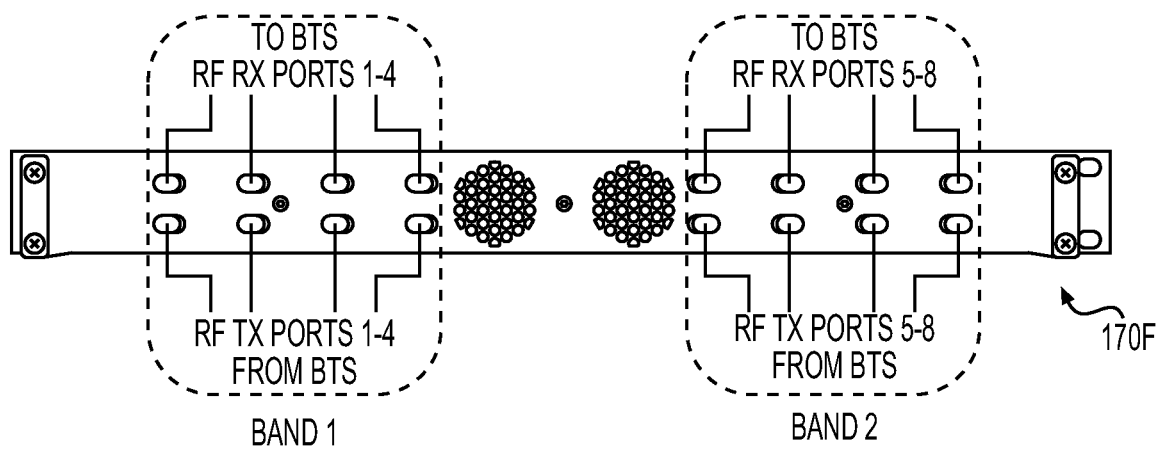
FIG. 11 illustrates a front view of an example mPOI useable with the alternate smart DAS of FIG. 5.
Figure 20:
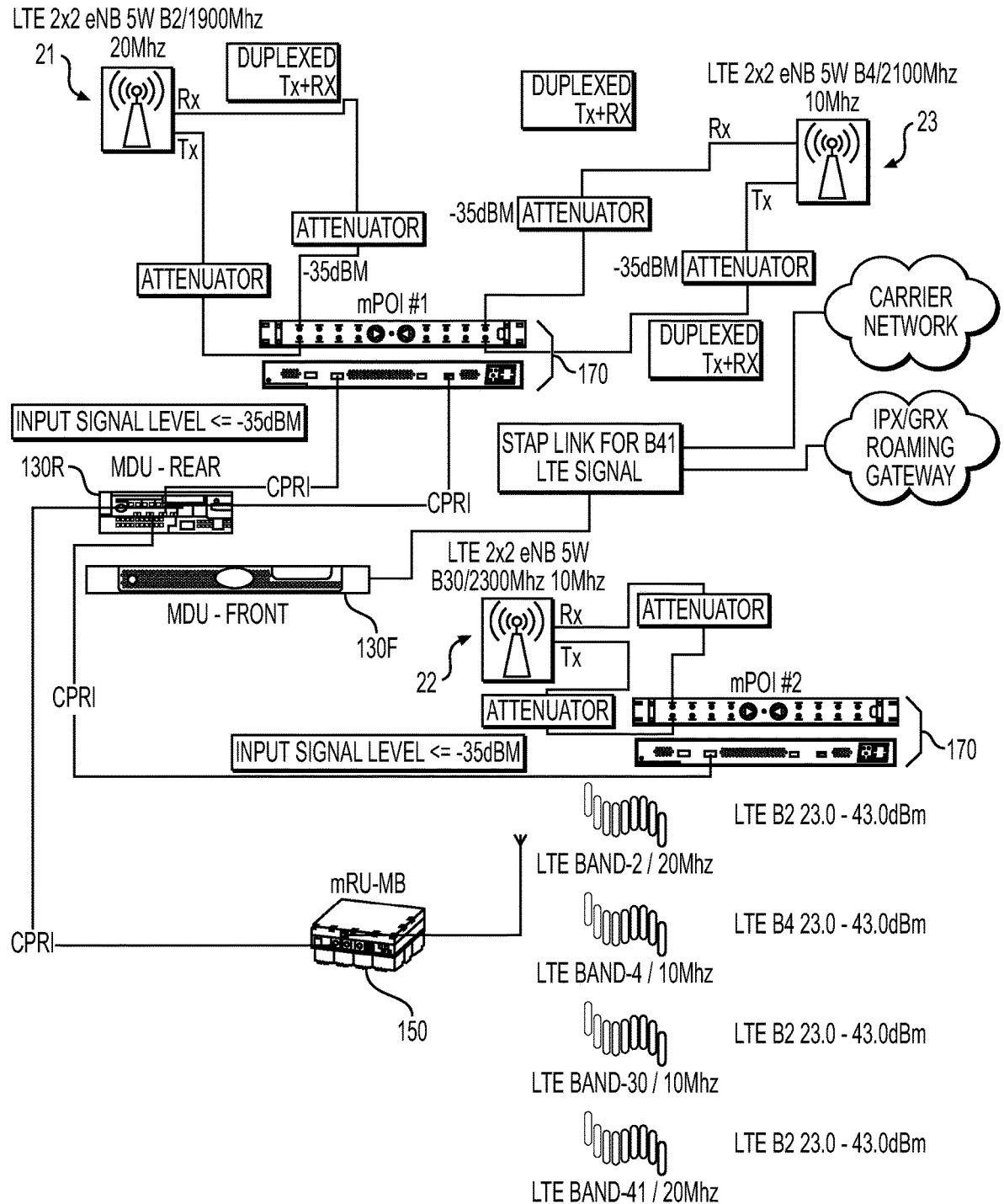
FIG. 20 illustrates an alternate implementation of the smart DAS of FIG. 5.

FIG. 11 illustrates a front view of an example mPOI 170 useable with the alternate smart DAS of FIGS. 5 and 20. While the mPOI 170 is described as useable in the sDAS of FIGS. 5 and 20, a person skilled in the art will appreciate that the mPOI 170 also may be included in any sDAS disclosed herein, including the sDAS of FIGS. 2 and 3.

Figure 12:
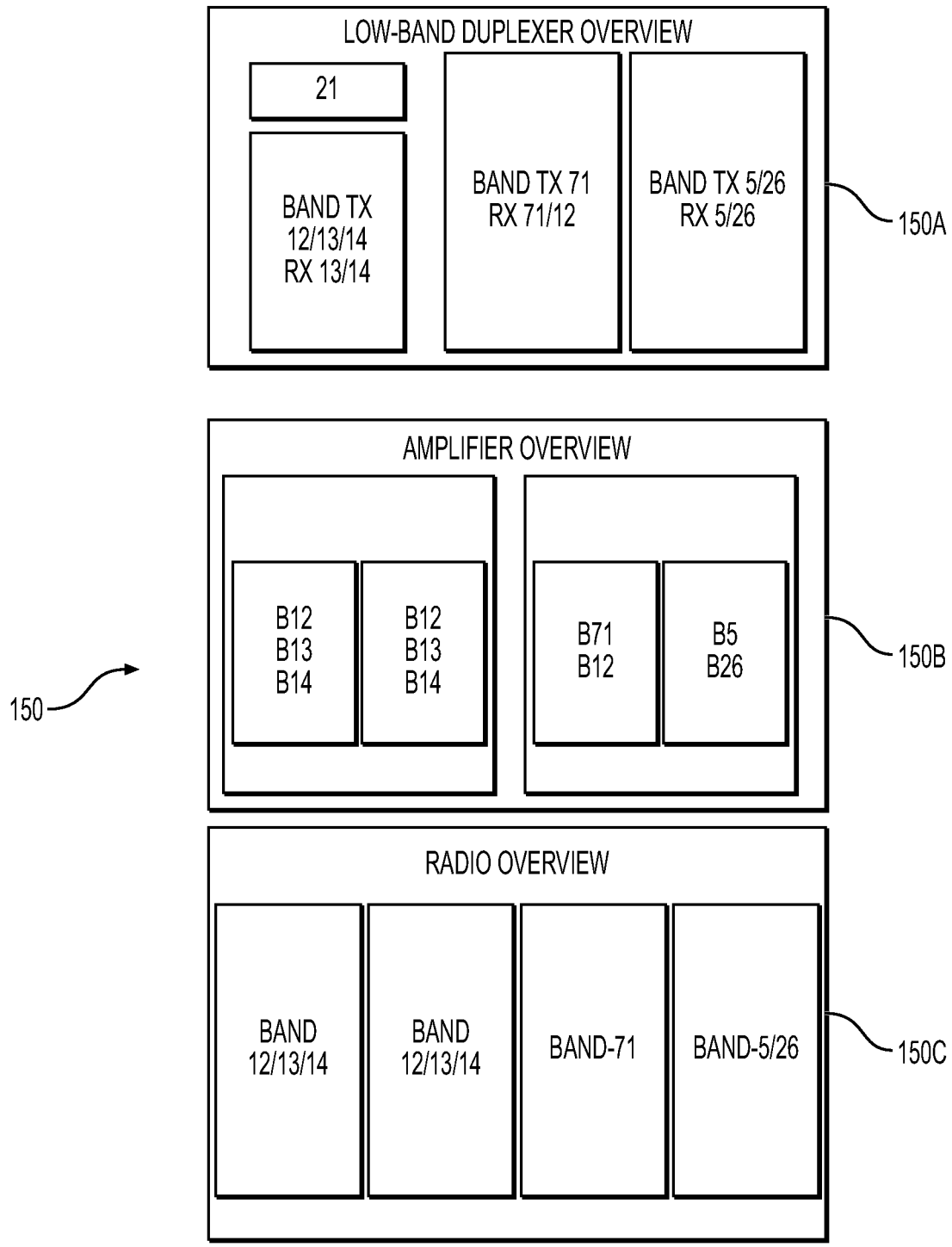
FIG. 12 illustrates an example low-band hardware stack-up for the example mRU of FIGS. 9A and 9B.

FIG. 12 illustrates an example low-band hardware stack-up (mRULB) for the example mRU of FIGS. 9A and 9B. A mid-band hardware stack-up (mRUMB) is similar to the mRULB of FIG. 12. In FIG. 12, mRULB 150 includes a low-band duplexer 150A, configured as a quad-band mechanical duplexer. The duplexer combined with amplifier unit 150B allows multiple frequency bands to be broadcast simultaneously from a single mRU 150. The illustrated 4×1 SISO configuration 150C supports the 700 MHz spectrum in bands 12, 17, 13, and 14, 600 Mhz spectrum in Band-71, and the 850 MHz spectrum in bands 5 and 26. Each amplifier for each of the four transmission channels may provide output power up to 43.0 dBm frequency range. The mechanical duplexer 150A also serves as a combiner to output all four of the signals to a single output antenna interface (port). A sDAS mRU mid-band (not shown) also allows multiple frequency bands to be broadcast simultaneously from a single hardware entity. The 4×1 SISO configuration supports the 1900 Mhz spectrum in bands 2 and 25, 2100 MHz in bands 4, 10, and 66, 2300 MHz in band-30, and TDD 2600 MHz band-41. Each of the amplifiers for each of the four transmission channels can provide output power up to 43.0 dBm frequency range. The mechanical duplexer also serves as a combiner to output all four of the signals to a single output antenna interface (port).

Figure 13:
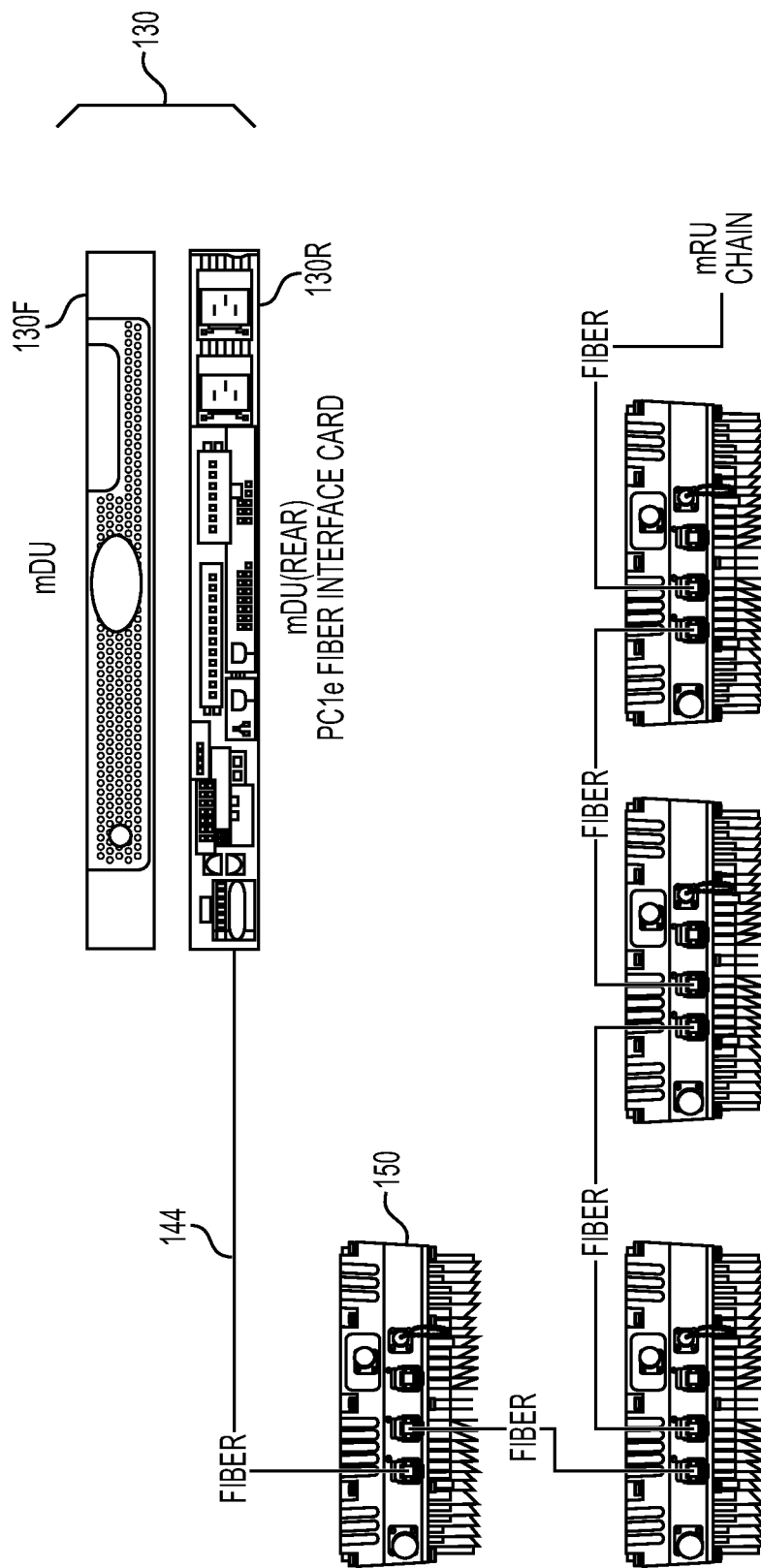
FIG. 13 illustrates an example mRU propagation for the smart DAS of FIG. 2.

FIG. 13 illustrates an example radio hardware (mRU 150) propagation for the sDAS of FIGS. 2 and 3. In FIG. 13, mDU 130 connects by optical fiber 145 to a first mRU 150, which in turn daisy-chains to subsequent mRUs 150.

Figure 14:
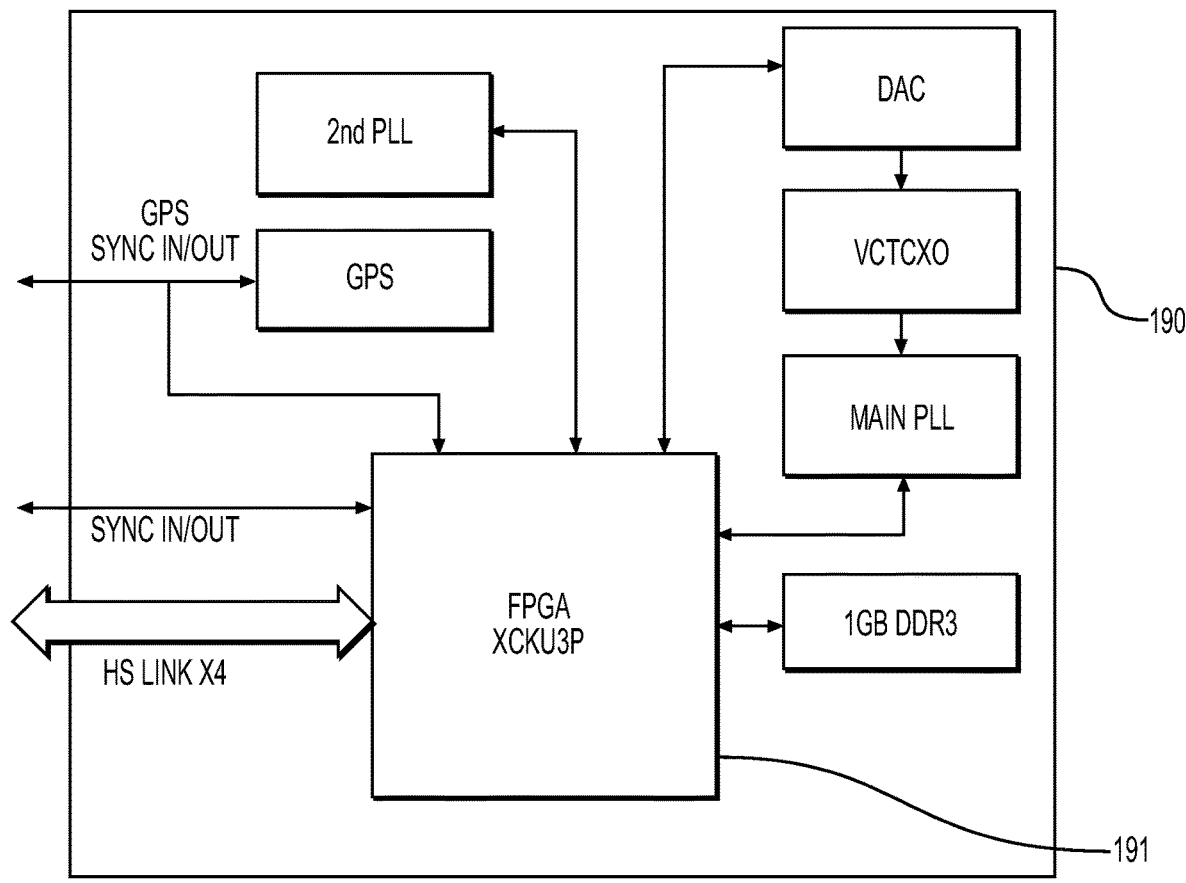
FIG. 14 is an example signal processing block for the PCIe to optical fiber interface (CPRI, eCPRI or ORAN compliant) card useable with the example smart DASs of FIGS. 2 and 5.

FIG. 14 is an example signal processing block 190 for a PCIe to optical fiber interface (CPRI, eCPRI or ORAN compliant) card useable with the example sDASs of FIGS. 2, 3, 5, and 20. The XCKU3P 191 is a Field Programmable Gate Array (FPGA) device that includes programming to enable low-level function signal processing. A PCIe bus allows for communication between a x86 sever processor of the mDU 130 to interface through the Gen 3.0 PCIe card slot to the FPGA 191. The FPGA 191 is equipped with onboard DDR3 memory for signal storage and data execution. A Digital to Analog Converter (DAC), Oscillator (VXTCO), and Phase-Lock Loop (PLL) support signal processing synchronization from the FPGA 191 to an attached mRU 150. optical fiber interface (CPRI, eCPRI or ORAN compliant) IP packet radio frames are transmitted and received via the SFP+modules that interface the optical fiber interface (CPRI, eCPRI or ORAN compliant) card to the mRU 150 over digital fiber optic IP network connectivity.

In an aspect, the sDAS utilizes two primary FPGA devices for communication, signal processing, and low-level functions. The PCIe optical fiber interface (CPRI, eCPRI or ORAN compliant) interface FPGA is responsible for digital signal processing, cell mapping, and optical fiber interface (CPRI, eCPRI or ORAN compliant) I/Q interface between the RMU of the mDU 130 and the mRU 150. Within the mRU 150 is a second FPGA that handles optical fiber interface (CPRI, eCPRI or ORAN compliant) de-mapping, signal distribution to the appropriate radio within the radio-head of the mRU 150 for analog signal distribution. The sDAS platform FPGA software is unique in that a single FPGA firmware can support both digitally generated signals for 2G GSM, 3G UMTS, 4G LTE, and 5G NR and includes additional signal processing to handle external BTS signal sources. The embedded FPGA firmware within each of the mRU 150 and the PCIe optical fiber interface (CPRI, eCPRI or ORAN compliant) card are unique to the sDAS platform.

Figure 15:
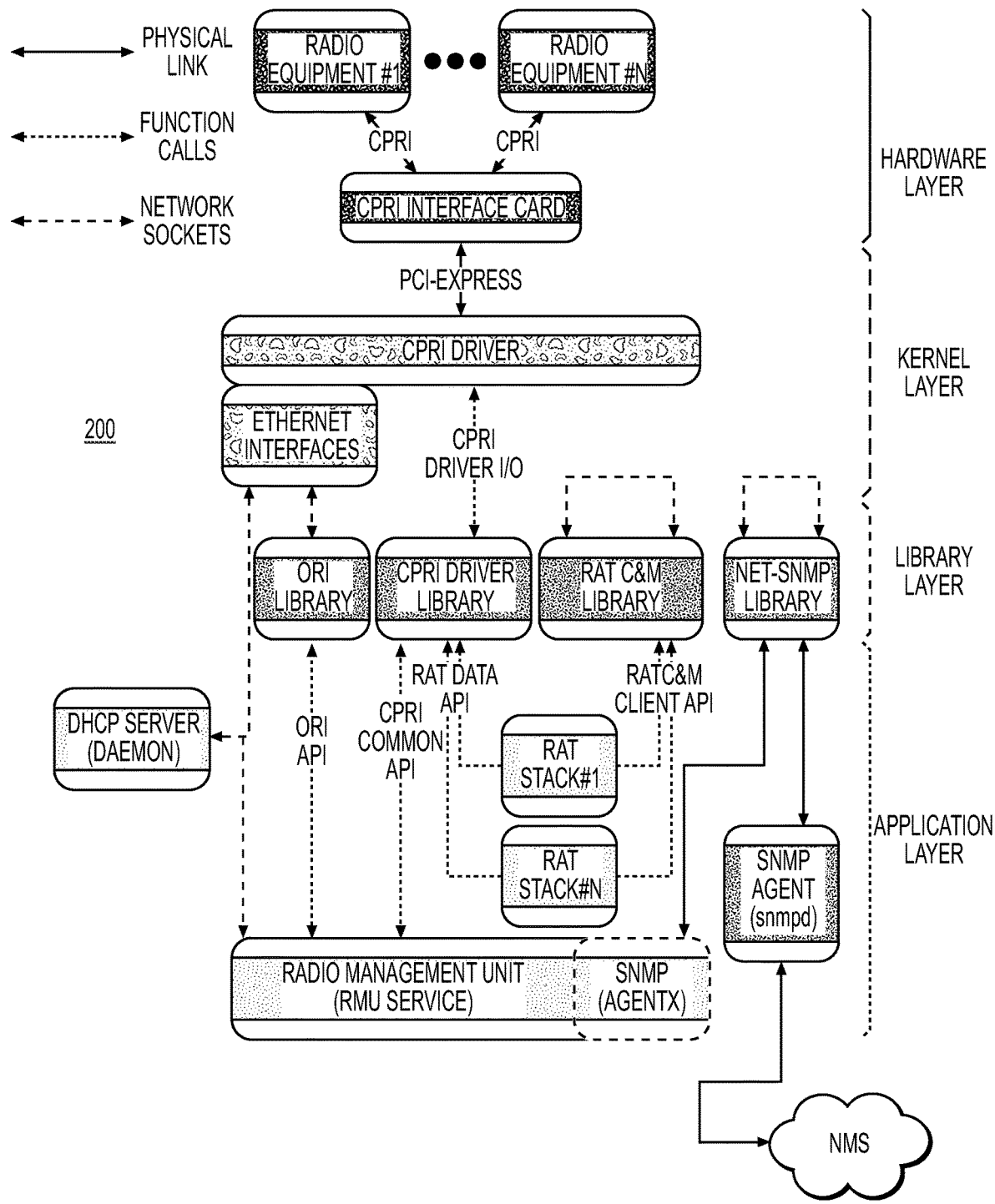
FIG. 15 is an example smart DAS hardware/software topology.

FIG. 15 is an example smart DAS hardware/software topology. The illustrated components are installed on the mDU 130 and use the RMU multiplexer function to interface the Radio Access Technologies into the mDU 130 for signal distribution through the operating system kernel driver to the PCIe optical fiber interface (CPRI, eCPRI or ORAN compliant) card and finally to the radio equipment for distribution over the distributed antennas. In addition, the software components leverage the Simple Network Manage Protocol (SNMP) and optical fiber interface (CPRI, eCPRI or ORAN compliant) card for configuration management, status, and alarming. For example, to enable remote configuration management, the RMU configuration can be defined via the Simple Network Management Protocol (SNMP).

Figure 16:
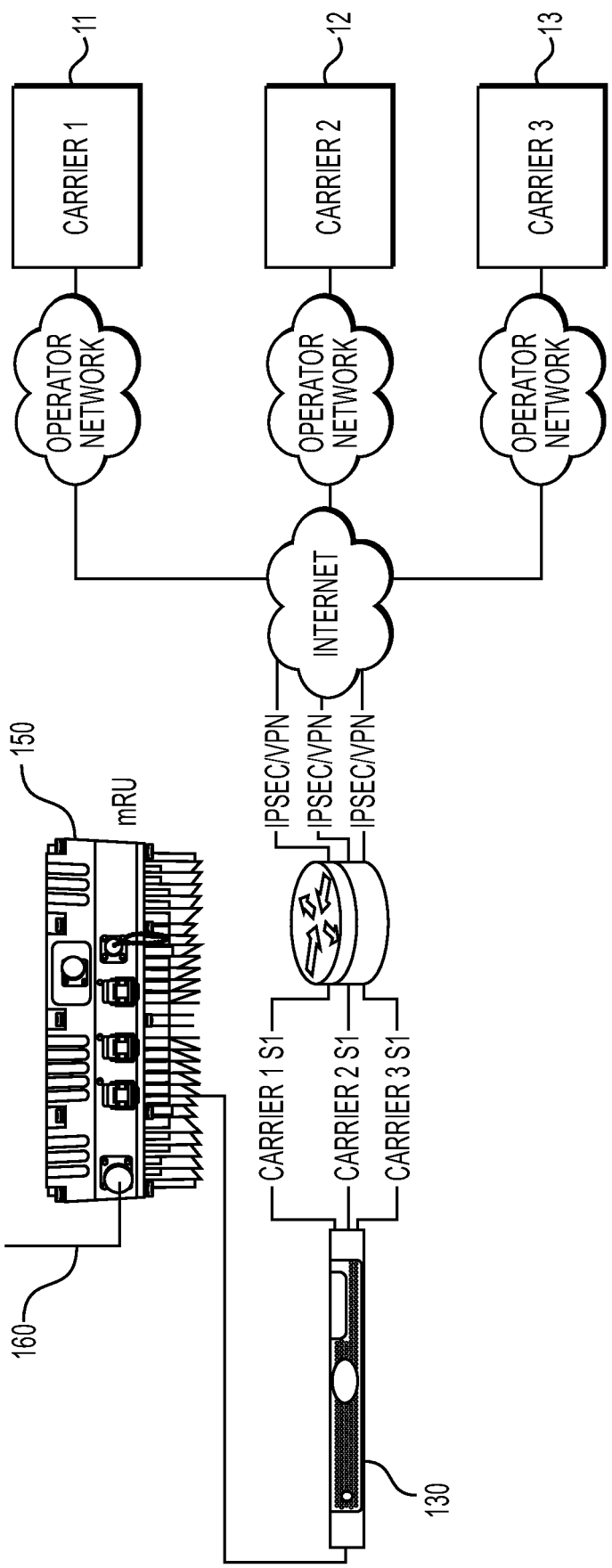
FIG. 16 is an example smart DAS WiFi architecture.

FIG. 16 is an example smart DAS WiFi architecture in which carriers 11, 12, and 13 provide Internet content though the sDAS (mDU 130 and mRU 150).

Figure 17:
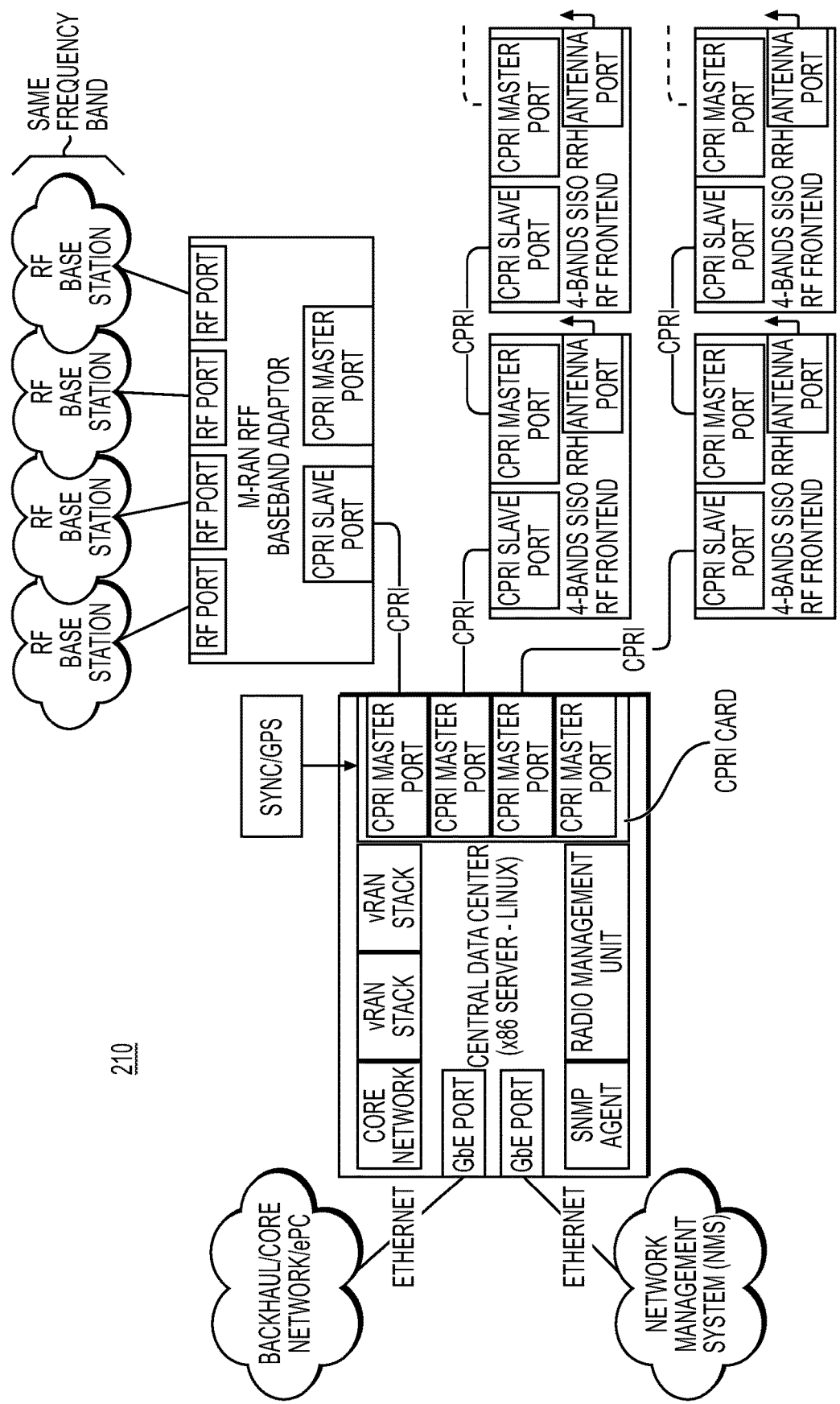
FIG. 17 illustrates an example implementation of a Common Public Radio Interface to the example mRU of FIGS. 9A and 9B.

FIG. 17 illustrates an example implementation 210 of an optical fiber interface (CPRI, eCPRI or ORAN compliant) card in the example mRU 150 of FIGS. 9A and 9B. A CPRI card is shown included on a central data center, which is a hardware component (Linux-based x86 server) of mDU 130.

Figure 18:
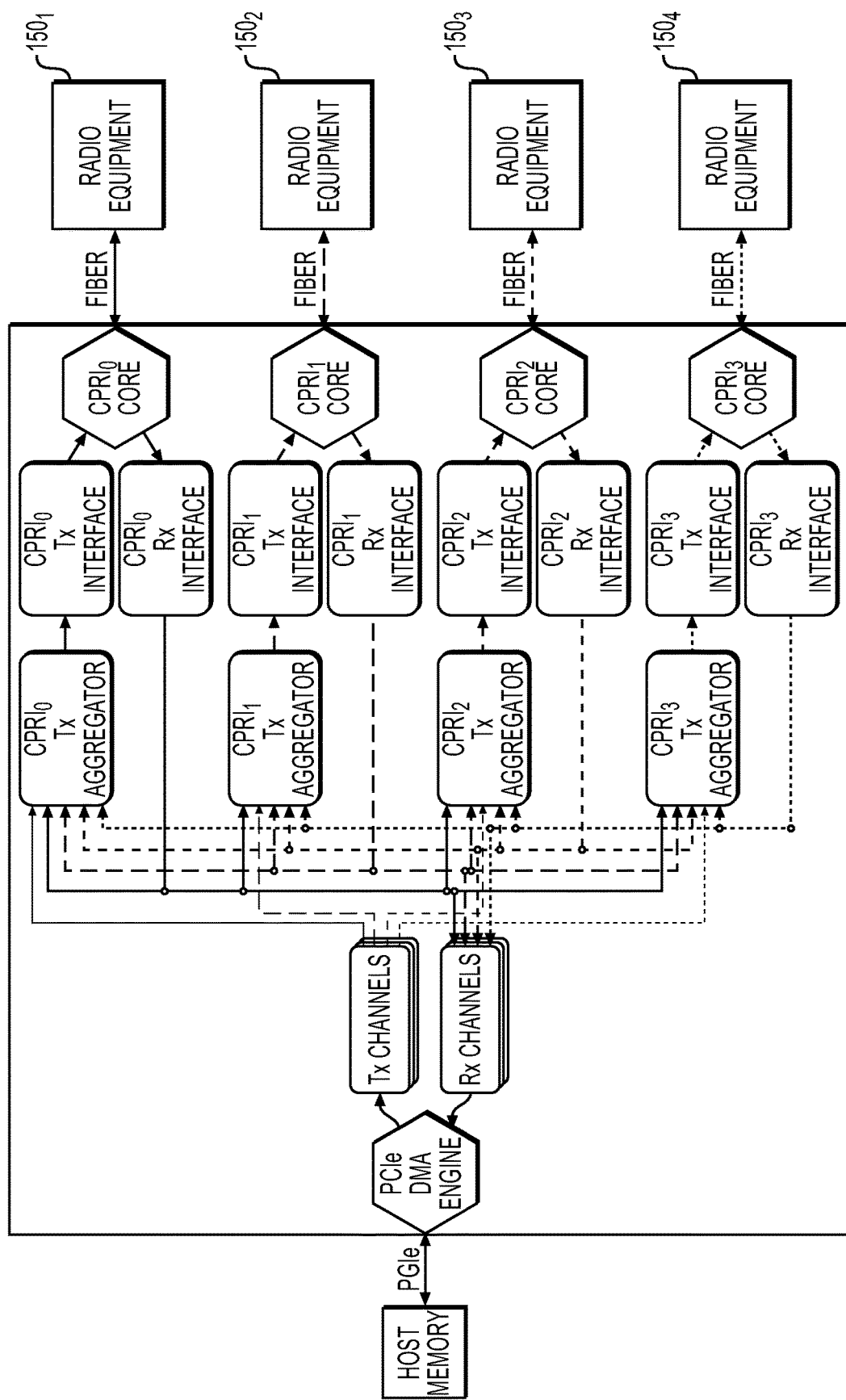
FIG. 18 illustrates signal processing in the example implementation of the Common Public Radio Interface of FIG. 17.

FIG. 18 illustrates signal processing in the example implementation of the optical fiber interface (CPRI, eCPRI or ORAN compliant) card of FIG. 17. The bitstream data mapping can be seen in FIG. 21. FIG. 18, from left-to-right, depicts the software architecture of the RMU multiplexer and interface into the optical fiber interface (CPRI, eCPRI or ORAN compliant) card of FIG. 17 for signal distribution. From left-to-right, the Host Memory represents the x86 server mDU processor memory and Direct Memory Access via PCIe into optical fiber interface (CPRI, eCPRI or ORAN compliant) card's kernel (Operating System) driver. A FPGA onboard the optical fiber interface (CPRI, eCPRI or ORAN compliant) card maps the Transmit (Tx) signals for distribution to the attached remote radio heads (mRU) and de-maps the return Receive (Rx) signals from the remote radio head receiver. In addition to providing an interface for multiple radio access technologies, the RMU multiplexer includes software logic to map the RAT to the appropriate frequencies and channel sizes. The RMU also serves as the software driver interface point for the mPOI signal input that allows external base station signals to be combined with locally generated digital base-band signals. The RMU, as noted operates in standard Linux 64-bit x86 architecture. In a conventional, legacy Base Transmitter Station (BTS) architecture, such processing is usually done within the Remote Radio Unit (RRU) as part of the Digital Front End (DFE) implementation of the wireless Base Station. However, in the case of M-RAN specification, this processing is moved into the optical fiber interface (CPRI, eCPRI or ORAN compliant) digital signal processing (DSP), which technically resides within the Base Band Unit (BBU). Other parts of the DFE, which are more "analog-driven" such as Crest-Factor-Reduction (CFR) and Digital-Pre-Distortion (DPD), are still present inside the RRU.

Figure 19:
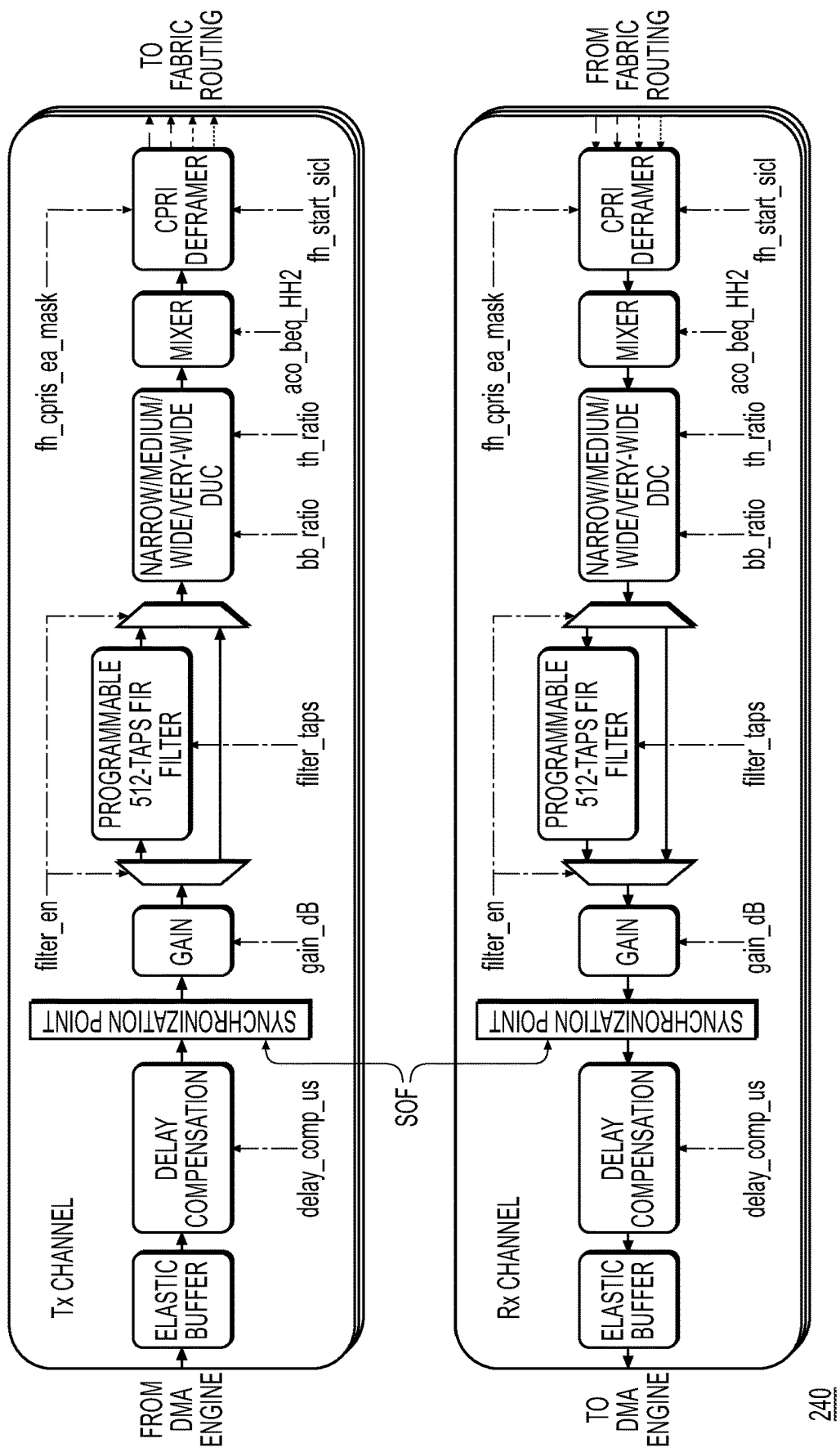
FIG. 19 illustrates example signal processing in an example optical fiber interface (CPRI, eCPRI or ORAN compliant) card in the example mDU of the example DASs of FIGS. 2 and 5.

FIG. 19 illustrates example signal processing in an optical fiber interface (CPRI, eCPRI or ORAN compliant) card installed in the mDU 130 of the example DASs of FIGS. 2, 3, 5 and 20. More specifically FIG. 19 gives an overview of the digital signal processing blocks present in each of the optical fiber interface (CPRI, eCPRI or ORAN compliant) Tx and Rx channels. The Tx/Rx directions are mostly symmetrical, with signal processing capabilities being identical but only the direction of the flow of I/Q data is reversed.

FIG. 20 illustrates an alternate implementation of the sDAS of FIG. 5. FIG. 5 depicts the most basic mPOI configuration with a Single Input Single Output (SISO) non-duplexed external analog base station source. In FIG. 5, a downlink from each of the external BTS 21, 22, 23 is attenuated to protect the mPOI 170 from signal input overdrive and the receive path (Rx) is not attenuated. FIG. 20 depicts three analog LTE signals from external base station source (BTS equipment) in three different frequency bands input via a mPOI interface as well as a fourth digitally generated LTE B41 carrier. The sDAS platform (mDUs 130, MPOIs 170, and mRUs 150) shown in FIG. 20 supports both the external BTS capability and the external BTS input from mPOI 170 simultaneously. In this configuration, because the external BTS source combines Tx and Rx in a fully duplexed configuration, both the Tx and Rx paths are attenuated.

Figure 21:
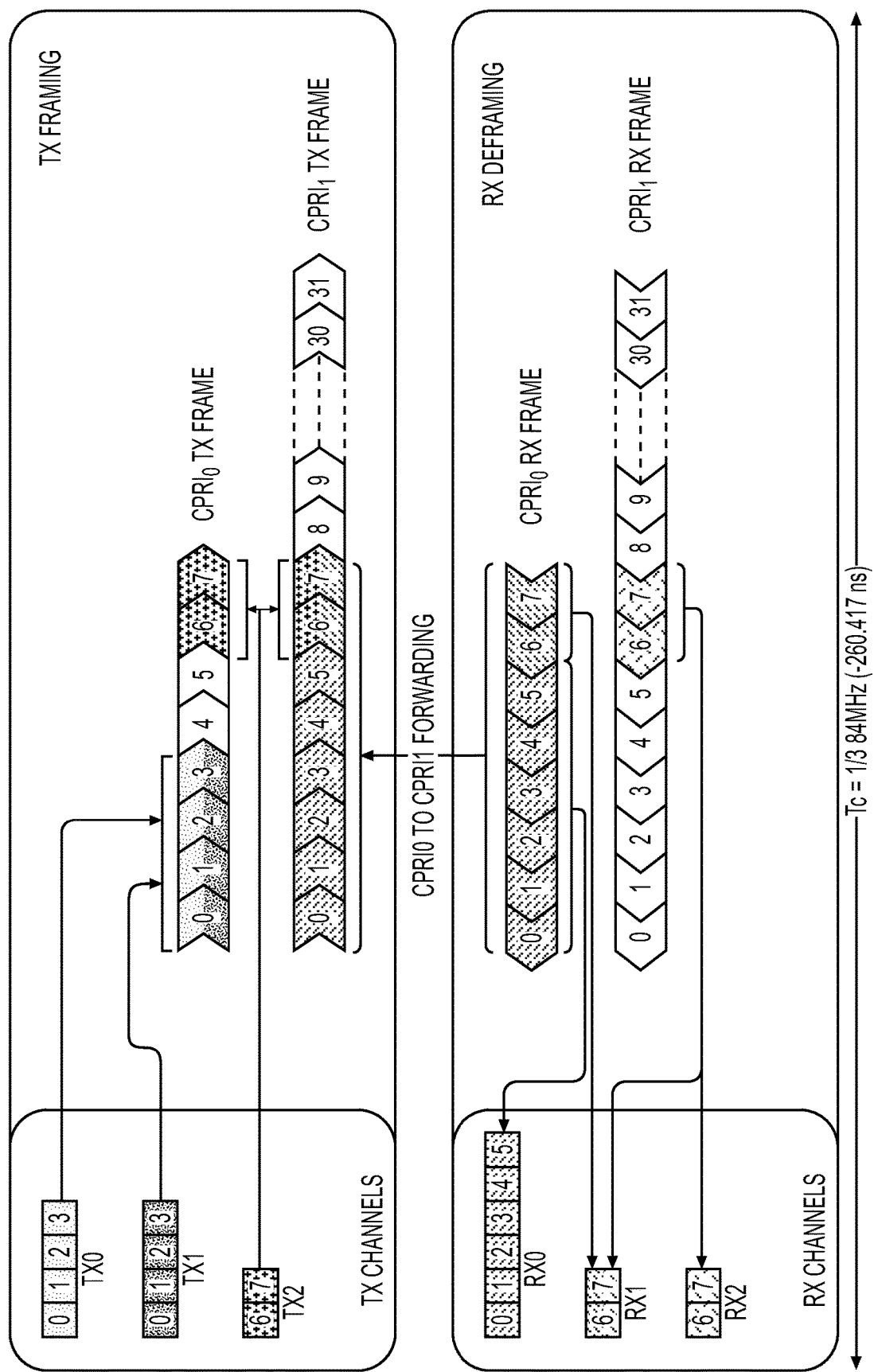
FIG. 21 illustrates example bit streams processed in the example DASs of FIGS. 2, 5, and 20.

FIG. 21 illustrates example configuration 300 of bit stream processing in the example DASs of FIGS. 2, 5, and 20. A framing/deframing sequence is periodic with a period of Tc=1/3.84 MHz (~260.417 nanoseconds). Each data block (either a channel's data block, or a data block included in an optical fiber interface (CPRI, eCPRI or ORAN compliant) Rx frame) is shown. Aggregated data blocks are displayed in sequence. As can be seen in FIG. 21, the optical fiber interface (CPRI, eCPRI or ORAN compliant) interface framing elaborates on the optical fiber interface (CPRI, eCPRI or ORAN compliant) I/Q data post aggregation for transport from the optical fiber interface (CPRI, eCPRI or ORAN compliant) card over digital fiber to the mRU remote radio head.

Figure 22:
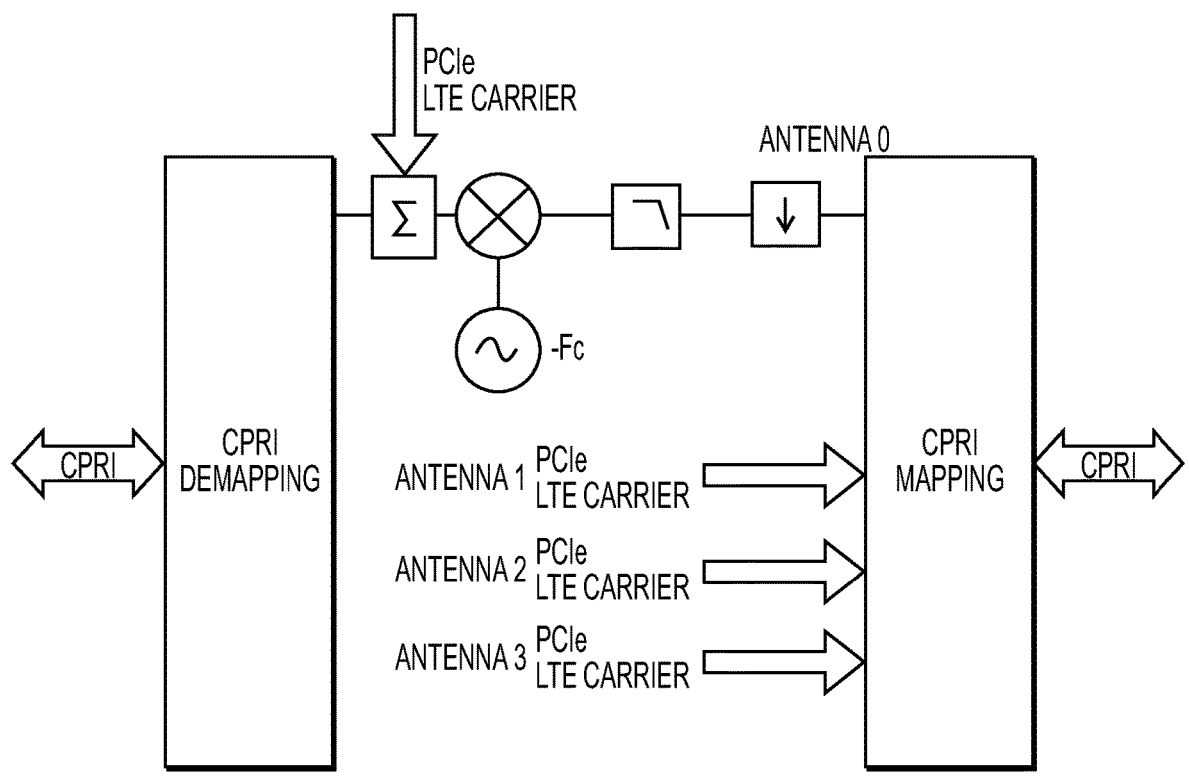
FIG. 22 illustrates example mappings and de-mappings in the example DASs of FIGS. 2, 5, and 20.
Figure 23:
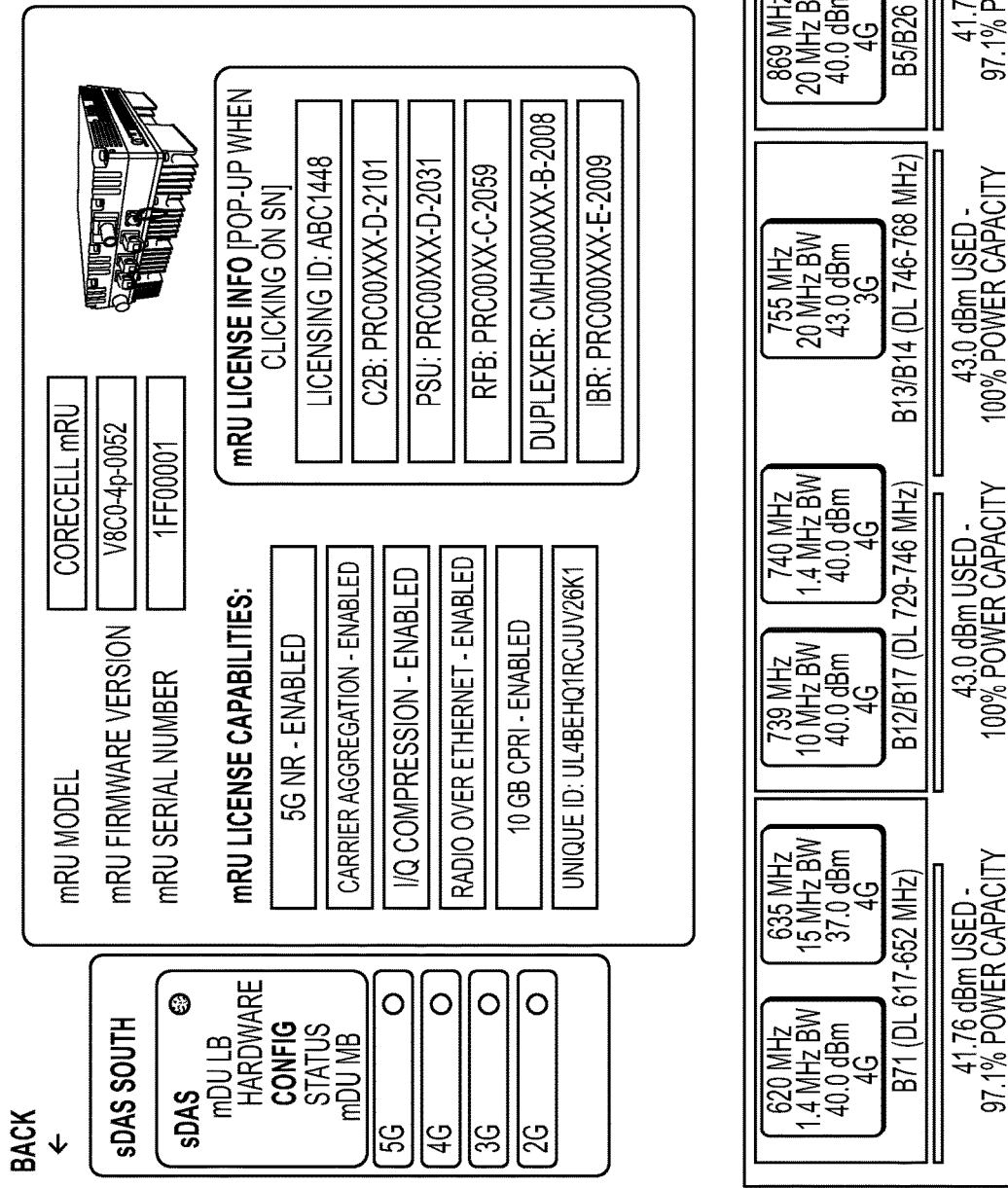
FIGS. 23-26 illustrate example user interfaces provided with the example DASs of FIGS. 2, 5, and 20.
Figure 24:
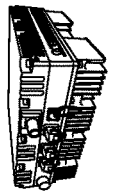
Figure 25:
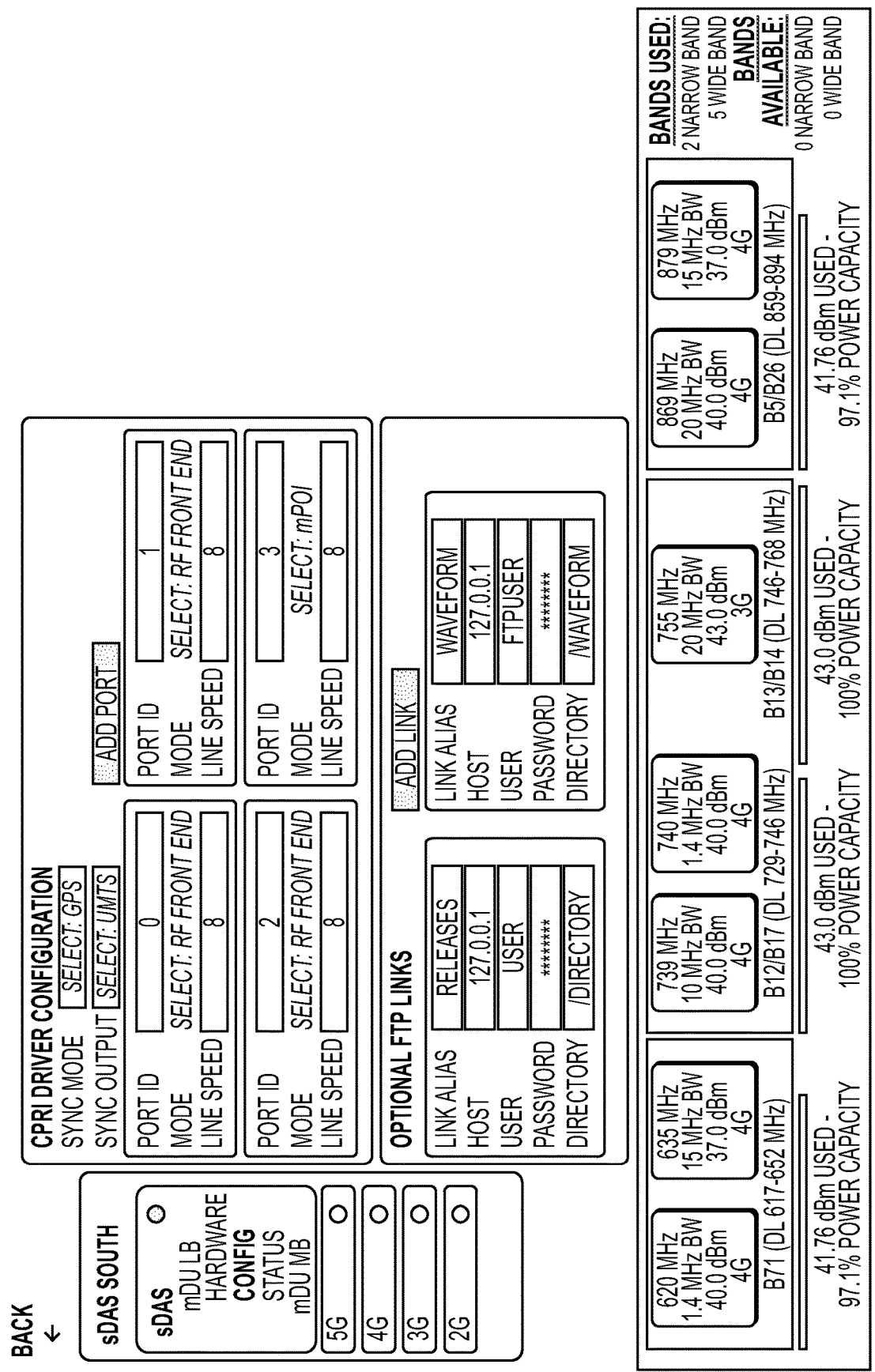
Figure 26:

FIG. 22 illustrates example mappings and de-mappings 400 in the example DASs of FIGS. 2, 5, and 20; specifically depicting the optical fiber interface (CPRI, eCPRI or ORAN compliant) digital interface mapping between the PCIe optical fiber interface (CPRI, eCPRI or ORAN compliant) card and the mRU remote radio-head. The digital signal carrier transports are automatically mapped and de-mapped to the appropriate radio devices within the mRU. Each of the transport signals are automatically mapped to the appropriate radio and antenna port during the de-mapping function. This method for transporting multiple signal channels allows the mDU 130 to support multiple concurrent 2G GSM, 3G UMTS, 4G LTE, or 5GNR signals to use a common digital signal transport between the mDU and the mRU remote radio-head.

FIGS. 23-26 illustrate example user interfaces provided with the example DASs of FIGS. 2, 5, and 20.

The preceding disclosure refers to various examples. The disclosed methods, platforms, devices, components, and systems contemplate using or implementing any suitable technique for performing the disclosed operations. Thus, the operations may be performed at any appropriate time, including concurrently, individually, or in combination. Moreover, the disclosed systems may use processes and methods with additional, fewer, and/or different steps.

Examples disclosed herein can be implemented in digital electronic circuitry, or in computer software, firmware, or hardware, including the herein disclosed structures and their equivalents. Some examples may be implemented as one or more computer programs, i.e., one or more modules of computer program instructions, encoded on computer storage medium for execution by one or more processors. A computer storage medium can be, or can be included in, a non-transitory computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed operations may be performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

I claim:

1. A smart, digital distributed antenna system incorporated on a single hardware platform, the single hardware platform configured to support multi-frequency, multi-carrier, and multi-Radio Access Technology (RAT) wireless communications, the single hardware platform, comprising:
one or more multi-radio access technology digital units (mDUs) configured to provide both digital and analog capabilities for multiple frequency bands of wireless communications, each mDU comprising:
a radio management unit, comprising:
a software multiplexer, comprising:
a digital signal mapper configured to combine digital communications signals comprising multiple radio access technologies and multiple frequency bands into a single digital signal, and
a digital signal de-mapper configured to separate digital signals according to radio access technology and frequency band;
a field programmable gate array (FPGA) coupled to the software multiplexer, the FPGA configured to receive the single digital signal from the software multiplexer, and to provide the single digital signal to a remote radio unit and to receive multiple radio access technologies and multiple radio frequency signals from the remote radio unit; and a single optical fiber interface (PCIe) coupled to the FPGA and configured to connect through a single fiber optical cable to one or more mobile radio units (mRUs), each mRU configured to connect to a digital transmit/receive antenna.

2. The smart, digital distributed antenna system of claim 1, wherein the single hardware platform further comprises a legacy analog input interface configured as a point of interface unit (mPOI), the mPOI configured to connect third party telecom equipment for signal distribution.

3. The smart, digital distributed antenna system of claim 1, wherein the single hardware platform is configured for passive air cooling only.

4. The smart, digital distributed antenna system of claim 1, wherein the single hardware platform is configured for single mode and for multi-mode transmission.

5. The smart, digital distributed antenna system of claim 1, wherein the single hardware platform is configured to simultaneously support second generation global system for mobile communications (2G GSM), third generation universal mobile telecommunications system (3G UTMS), fourth generation long term evolution (4G LTE), and fifth generation radio (5G NR) wireless technologies.

6. The smart, digital distributed antenna system of claim 1, wherein the mDU comprises one or more software Radio Access Technology (RAT) stacks configured to interface to the software multiplexer.

7. The smart, digital distributed antenna system of claim 1, wherein the single optical fiber interface is configured to provide a common public radio interface (CPRI), an enhanced CPRI (eCPRI), and an open radio access network (ORAN) interface.

8. The smart, digital distributed antenna system of claim 1, wherein the single hardware platform is configured to provide a Web Management Interface (WMI), the WMI configured to allow third party telecom equipment operators to configure, manage, and monitor signals, select a spectrum for which a software RAT stack will operate, configure software RAT stack properties selected from a group consisting of Cell Identification, peripheral component interface (PCI), and Evolved UMTS Terrestrial Radio Access Network Absolute Radio Frequency Channel Number (EARFCN), and set a target transmit power.

9. The smart, digital distributed antenna system of claim 8, wherein the remote radio units are software controlled and managed via the WMI to support radio frequency (RF) power output control at a per-cell level.

10. The smart, digital distributed antenna system of claim 8, wherein the third party telecom equipment operators are enabled to share common hardware resources for signal distribution within a facility, to select a spectrum for which the software RAT stack will operate, and the software multiplexer is configured to add signal sources to a transmission path and bring new cells into service.

11. The smart, digital distributed antenna system of claim 8, wherein the single hardware platform is configured to be shared between multiple mobile telecoms, in-building, or outdoor distributed antenna system (DAS) operators, wherein each operator independently manages each operator's cells and radio access technologies via a mDU.

12. The smart, digital distributed antenna system of claim 8, wherein each third-party telecom equipment operator remotely accesses a mDU the WMI through login credentials to add, delete, or modify Radio Access Technologies in real-time.

13. The smart, digital distributed antenna system of claim 1, wherein the one or more mDUs comprise a low band mDU and a mid-band mDU.

14. The smart, digital distributed antenna system of claim 1, wherein the interface PCIe is configured to support a daisy chain connection over the single optical cable to a plurality of remote radio units.

15. The smart, digital distributed antenna system of claim 1, wherein each of a plurality of distributed antennas is configured to broadcast multiple RAT signals in multiple frequency bands.

16. A multi-radio access technology digital unit (mDU) implemented in digital electronic circuitry and configured to provide both digital and analog capabilities for multiple frequency bands of wireless communications, the mDU comprising:
a radio management unit, comprising:
a software multiplexer, comprising:
a digital signal mapper configured to combine digital communications signals comprising multiple radio access technologies and multiple frequency bands into a single digital signal, and
a digital signal de-mapper configured to separate digital signals according to radio access technology and frequency band;
a field programmable gate array (FPGA) coupled to the software multiplexer, the FPGA configured to receive the single digital signal from the software multiplexer, and to provide the single digital signal to a remote radio unit and to receive multiple radio access technologies and multiple radio frequency signals from the remote radio unit; and
a single optical fiber interface (PCIe) coupled to the FPGA and configured to connect through a single fiber optical cable to one or more mobile radio units (mRUs), each mRU configured to connect to a digital transmit/receive antenna.

17. The mDU of claim 16, further configured to receive analog signals via a point of interface unit (mPOI), the mPOI configured to connect third party equipment for signal distribution, wherein the PCIe optical fiber interface is configured to provide a common public radio interface (CPRI), an enhance CPRI (eCPRI), and an open radio access network (ORAN) interface, wherein the interface PCIe is configured to support a daisy chain connection over the single optical cable to a plurality of remote radio units.

18. The mDU of claim 16, configured to provide a Web Management Interface (WMI), the WMI configured to allow wireless communication operators to configure, manage, and monitor signals, select a spectrum for which a software RAT stack will operate, configure software RAT stack properties selected from a group consisting of Cell Identification, PCI, and EARFCN, and set a target transmit power.

19. The mDU of claim 18, wherein each third-party telecom equipment operator remotely accesses a mDU through WMI login credentials to add, delete, or modify Radio Access Technologies in real-time.

20. A non-transitory, computer-readable storage medium having encoded thereon, machine instructions that when executed, cause a processor system of an mDU to provide both digital and analog capabilities for multiple frequency bands of wireless communications, comprising a processor of the mDU:
receives wireless digital signals having one of a multiple radio access technology and one of a specific frequency band from one or more communications providers;

controls a software multiplexer to combine the received wireless signals into a single wireless signal; and interfaces with a FPGA coupled to the software multiplexer and configured to receive the single digital signal from the software multiplexer, to provide the single digital signal, over single optical fiber interface (PCIe) coupled to the FPGA and configured to connect through a single fiber optical cable to one or more mobile radio units (mRUs), each mRU configured to connect to a digital antenna.

* * * * *